US011069011B1

(12) United States Patent
Jung et al.

(10) Patent No.: US 11,069,011 B1
(45) Date of Patent: Jul. 20, 2021

(54) ACQUIRING INTELLECTUAL PROPERTY ASSETS

(71) Applicant: IVP Holdings III LLC, Bellevue, WA (US)

(72) Inventors: Edward K. Y. Jung, Bellevue, WA (US); Vivek U. Nayak, Seattle, WA (US); Trevor Williams, Bellevue, WA (US)

( * ) Notice: Subject to any disclaimer, the term of this patent is extended or adjusted under 35 U.S.C. 154(b) by 255 days.

(21) Appl. No.: 15/900,751

(22) Filed: Feb. 20, 2018

Related U.S. Application Data

(63) Continuation of application No. 13/113,964, filed on May 23, 2011, now abandoned, which is a continuation of application No. 12/869,686, filed on Aug. 26, 2010, now abandoned.

(60) Provisional application No. 61/237,241, filed on Aug. 26, 2009.

(51) Int. Cl.
*G06Q 50/18* (2012.01)
*G06F 3/0482* (2013.01)
*G06Q 40/06* (2012.01)
*G06Q 40/04* (2012.01)

(52) U.S. Cl.
CPC ......... *G06Q 50/184* (2013.01); *G06F 3/0482* (2013.01); *G06Q 40/04* (2013.01); *G06Q 40/06* (2013.01)

(58) Field of Classification Search
USPC .......................................................... 705/35
See application file for complete search history.

(56) References Cited

U.S. PATENT DOCUMENTS

| 5,999,907 | A | 12/1999 | Donner |
| 6,148,304 | A | 11/2000 | de Vries et al. |
| 6,154,725 | A | 11/2000 | Donner |
| 6,263,314 | B1 | 7/2001 | Donner |
| 6,330,547 | B1 * | 12/2001 | Martin ................. G06Q 40/025 705/38 |

(Continued)

OTHER PUBLICATIONS

Anaqua, Inc., "Anaqua—Patent Management," Jul. 24, 2008, <http://www.anaqua.com/products/patents.html>, 7 pages.

(Continued)

*Primary Examiner* — Hani M Kazimi
*Assistant Examiner* — Hatem M Ali
(74) *Attorney, Agent, or Firm* — Ellen M. Bierman; Lowe Graham Jones PLLC

(57) ABSTRACT

A facility for facilitating processes for acquiring intellectual property assets ("assets") is described. In some embodiments, the facility enables an organization operating the facility to generate a budget for a proposed acquisition of assets. The organization may include multiple entities that are together interested in acquiring the assets. The entities may each provide values for the assets, either by applying rules that automatically attribute values to the assets, by having human analysts manually analyze the assets to estimate their values, or by some combination of these two techniques. The facility generates the budget based on the values determined for the assets. A person or team of people responsible for the proposed acquisition of assets can use the budget in negotiations to acquire the assets. If the assets are acquired, the facility can allocate acquisition and post-acquisition expenses among the entities on whose behalf the assets were acquired.

19 Claims, 21 Drawing Sheets

(56) References Cited

U.S. PATENT DOCUMENTS

| | | |
|---|---|---|
| 6,556,992 B1 | 4/2003 | Barney et al. |
| 6,931,389 B1 | 8/2005 | Bleizeffer et al. |
| 6,952,698 B2 | 10/2005 | Delaire et al. |
| 7,092,935 B2 | 8/2006 | Yourlo et al. |
| 7,127,405 B1 | 10/2006 | Frank et al. |
| 7,292,994 B2 | 11/2007 | Prokoski |
| 7,546,265 B1 | 6/2009 | Donner |
| 7,606,757 B1 | 10/2009 | Poltorak |
| 7,624,096 B1 | 11/2009 | Harvey |
| 7,634,455 B1 | 12/2009 | Keene et al. |
| 7,716,060 B2 | 5/2010 | Germeraad et al. |
| 7,716,103 B1 | 5/2010 | Donner |
| 7,835,969 B1 | 11/2010 | Donner |
| 7,865,959 B1 | 1/2011 | Lewis |
| 7,949,728 B2 | 5/2011 | Rivette et al. |
| 8,145,506 B2 | 3/2012 | Haskell et al. |
| 8,380,548 B2 | 2/2013 | Ng et al. |
| 8,595,113 B1 | 11/2013 | Chittoor et al. |
| 2001/0034695 A1 | 10/2001 | Wilkinson |
| 2001/0042034 A1 | 11/2001 | Elliott |
| 2002/0004775 A1 | 1/2002 | Kossovsky et al. |
| 2002/0046038 A1* | 4/2002 | Prokoski ............. G06Q 40/00 705/36 R |
| 2002/0095368 A1 | 7/2002 | Tran |
| 2002/0138297 A1 | 9/2002 | Lee |
| 2002/0143760 A1 | 10/2002 | Kim et al. |
| 2002/0178029 A1 | 11/2002 | Nutter et al. |
| 2003/0036945 A1 | 2/2003 | Del Vecchio et al. |
| 2003/0149588 A1 | 8/2003 | Joao |
| 2004/0153374 A1 | 8/2004 | Nelson |
| 2004/0181427 A1 | 9/2004 | Stobbs et al. |
| 2004/0220842 A1 | 11/2004 | Barney |
| 2004/0249739 A1 | 12/2004 | Axford |
| 2005/0010515 A1 | 1/2005 | Woltjen |
| 2005/0108118 A1 | 5/2005 | Malackowski et al. |
| 2005/0256777 A1 | 11/2005 | Kotera et al. |
| 2005/0261927 A1 | 11/2005 | Bilak et al. |
| 2006/0010055 A1 | 1/2006 | Morita et al. |
| 2006/0036452 A1 | 2/2006 | Williams |
| 2006/0036453 A1* | 2/2006 | Williams ............. G06Q 10/00 705/1.1 |
| 2006/0036635 A1 | 2/2006 | Williams |
| 2006/0080136 A1 | 4/2006 | Frank et al. |
| 2006/0259315 A1 | 11/2006 | Malackowski et al. |
| 2007/0073625 A1* | 3/2007 | Shelton ............. G06Q 90/00 705/59 |
| 2007/0078886 A1 | 4/2007 | Rivette et al. |
| 2007/0088645 A1* | 4/2007 | Lin ............. G06Q 30/08 705/36 R |
| 2007/0136373 A1 | 6/2007 | Piasecki et al. |
| 2007/0208669 A1* | 9/2007 | Rivette ............. G06Q 50/184 705/59 |
| 2007/0219939 A1 | 9/2007 | Van Luchene et al. |
| 2007/0244837 A1 | 10/2007 | Plow et al. |
| 2007/0276796 A1 | 11/2007 | Sampson |
| 2007/0282619 A1 | 12/2007 | Cheek |
| 2008/0005103 A1 | 1/2008 | Ratcliffe et al. |
| 2008/0033736 A1 | 2/2008 | Bulman |
| 2008/0126951 A1 | 5/2008 | Sood et al. |
| 2008/0140641 A1 | 6/2008 | Wang |
| 2008/0243642 A1 | 10/2008 | Ramer |
| 2008/0294683 A1 | 11/2008 | Graham et al. |
| 2009/0030713 A1 | 1/2009 | Venkatachalam |
| 2009/0171858 A1 | 7/2009 | Kwitek |
| 2009/0182739 A1 | 7/2009 | Crockett et al. |
| 2009/0300016 A1 | 12/2009 | Kile, Jr. |
| 2009/0307577 A1 | 12/2009 | Lee |
| 2009/0328105 A1 | 12/2009 | Craner et al. |
| 2010/0082395 A1 | 4/2010 | De Andrade |
| 2010/0262653 A1 | 10/2010 | Chaffee et al. |
| 2010/0332285 A1 | 12/2010 | Dunagan et al. |
| 2011/0029451 A1* | 2/2011 | Henning ............. G06Q 40/04 705/36 R |
| 2012/0323803 A1 | 12/2012 | Lee |
| 2013/0212083 A1 | 8/2013 | Beattie et al. |
| 2013/0226967 A1 | 8/2013 | Gross et al. |

OTHER PUBLICATIONS

Jensen, C. "ClientDataSet Aggregates and GroupState," 2002, captured from <edn.embarcadero.com/article/29272>, 1 page.

"Total Cost of Ownership," Wikipedia, Feb. 11, 2005, <https://en.wikipedia.org/w/index.php?title=Total_cost_of_ownership&oldid=14142965>, 1 page.

* cited by examiner

Home > Deals > Deal View

Deal Info
- Name: Deal 2
- State: Active
- Deal Owner: Person
- Finder: No Finder
- Seller's Legal Name: [Select a Seller]
- Asking Price:
- Offer Price:
- Importance: Normal

- ID: 8194
- Stage: 3-Valuation
- Fund: Fund
- Fee: Percent: %

View PQR

MARK AS REVERSE DEAL
SAVE AND SEND HANDSHAKE

Save and Send Deal Flow Email

State History
Active 12/31/2009

Stage History
3-Valuation 12/31/2009

Notes:

Historical Deal Notes (0)

Marketing Info
- Region: US & Canada
- Segment: Business
- Competitor:
- Technology Area(s):
- Licensees(s):

Costs
- Upfront Price:
- PerApp Issuance Fee:
- Other Costs:
- Total Finder's Fee: $0
- Acquisition Cost:
- Cost Per Asset:
- Profit Participation: %

TCLs

|     | Kno. | Est. | Total |
|-----|------|------|-------|
| LP1 | 11   | 0    | 11    |
| LP2 | 11   | 0    | 11    |
| LP3 | 11   | 0    | 11    |

Assets

|                       | Active |     |     | Expired |     |     | Totals |     |     |
|-----------------------|--------|-----|-----|---------|-----|-----|--------|-----|-----|
|                       | Kno.   | Est.| Tot.| Kno.    | Est.| Tot.| Kno.   | Est.| Tot.|
| US Patents:           | 11     | 0   | 11  | 0       | 0   | 0   | 11     | 0   | 11  |
| US Applications:      | 0      | 0   | 0   | 0       | 0   | 0   | 0      | 0   | 0   |
| International Patents:| 0      | 0   | 0   | 0       | 0   | 0   | 0      | 0   | 0   |
| International App's:  | 0      | 0   | 0   | 0       | 0   | 0   | 0      | 0   | 0   |
| Totals:               | 11     | 0   | 11  | 0       | 0   | 0   | 11     | 0   | 11  |

SAVE AND MANAGE ASSETS

| ▼ Pricing    | Status: Not Submitted               | REVIEW HITS | SUBMIT TO RULES |
| ▼ Technology | Elite / TAS Complete for All Assets | DEAL ASSET TAS VIEW | IMPORT TAS |
| Diligence    | available after Handshake           |
| Intake       | available after Handshake           |

*FIG. 6*

FIG. 9

Deal 2

| Business Unit | Business Unit 2 | Business Unit 2 | Business Unit 3 | Business Unit 4 | Business Unit 5 | Investors |
|---|---|---|---|---|---|---|
| No. of Assets with Rule Hits | 0 | 7 | 9 | 2 | 0 | 0 |
| No. of Assets without Rule Hits | 11 | 4 | 2 | 9 | 11 | 11 |
| Entity Total Value | $0 | $5,000 | $120,000 | $0 | $0 | $0 |
| Per Asset | $0 | $714 | $13,333 | $0 | $0 | $0 |
| Distinct Interest | 0.00% | 63.64% | 81.82% | 18.18% | 0.00% | 0.00% |
| Deal % $s | 0.00% | 4.00% | 96.00% | 0.00% | 0.00% | 0.00% |

| | |
|---|---|
| Total Value | $125,000 |
| Number of Assets Submitted | 11 |
| Distinct Interest Asset Count | 10 |
| Asking Price | $1,000,000 |

1000

Deal Valuation Search

| Tech Area | Asset Type | Valuation Type | Portfolio | Assets per page |
|---|---|---|---|---|
| All | All | All | All | 10 |

Valuation Type dropdown:
- All
- Rules Value
- PA Value
- NA
- Not Requested

REQUEST VALUATION  1005    1010

11 assets (viewing 1 to 10)     1 2 > >>    Page 1 of 2

| Asset ▽ | Type | Title | Current Total | PQR Tech Category | BU1 | BU2 | BU3 | BU4 | BU5 | Investors |
|---|---|---|---|---|---|---|---|---|---|---|
| 4,000,000 | US Pat | Title 1 | $0 | Tech Category 1 | ■ | ■ | ■ | ■ | ■ | ■ |
| 4,000,001 | US Pat | Title 2 | $10,500 | | ■ | $500 | $10,000 | ■ | ■ | ■ |
| 4,000,002 | US Pat | Title 3 | $20,000 | Tech Category 1 | ■ | ■ | $20,000 | ■ | ■ | ■ |
| 4,000,003 | US Pat | Title 4 | $21,000 | Tech Category 1 | ■ | $1,000 | $20,000 | ■ | ■ | ■ |
| 4,000,004 | US Pat | Title 5 | $10,000 | Tech Category 1 | ■ | ■ | $10,000 | ■ | ■ | ■ |

*FIG. 10*

| P.A. | Int. | Ext. | Co. | | Deal Valuation (86) | Deal Evaluations (14) | Portfolio Requests (1) | Portfolio Evaluations (0) |
|---|---|---|---|---|---|---|---|---|
| PA 1 Business Unit 1 | | | 2 | | Deal △ | E/B | Comp. | Inc. | Assets | Valuation Due |

| Deal | E/B | Comp. | Inc. | Assets | Valuation Due |
|---|---|---|---|---|---|
| Deal 1 | Basic | 0 | 1 | 1 | 12/31/2009 |
| Deal 2 | Basic | 0 | 2 | 11 | 12/31/2009 |
| Deal 3 | Basic | 0 | 1 | 17 | 12/31/2009 |
| Deal 4 | Elite | 0 | 14 | 22 | 12/31/2009 |
| Deal 5 | Basic | 0 | 1 | 256 | 12/31/2009 |
| Deal 6 | Basic | 0 | 2 | 2 | 12/31/2009 |
| Deal 7 | | 0 | 1 | 19 | 12/31/2009 |

Left panel 1110:
- PA 1 Business Unit 1 — 2
- PA 2 Business Unit 2 — 26
- PA 3 Business Unit 3 — 17
- PA 4 Business Unit 4 — 20
- PA 5 Business Unit 5 — 24
- PA 6 Investors — 6

| Deal: Deal 2 | | | | | | | | | | | | | |
|---|---|---|---|---|---|---|---|---|---|---|---|---|---|
| Deal 2 (11 assets) —1305 | | | | | | | | | | | | | |

Analyst: PA 2   Assigned by: Rules Engine   Priority: Normal
Date completed: (in progress)   Date requested: 12/31/2009   Target date: 12/31/2009

| | View Analysis | Asset | Title | Technology Area | Key Valuation | Current Use | Relevance to Standards | Validity Opinion | Comments | Indep. Claims | Current Value | Explanation | Technical Scope | Licensee Candidates |
|---|---|---|---|---|---|---|---|---|---|---|---|---|---|---|
| 1 | View Analysis | 4,000,000 US Pat | Title 1 | | | | | N/A | | 6 | | | | |
| 2 | View Analysis | 4,000,001 US Pat | Title 2 | | | | | N/A | | 4 | | | | |
| 3 | View Analysis | 4,000,002 US Pat | Title 3 | | | | | N/A | | 3 | | | | |
| 4 | View Analysis | 4,000,003 US Pat | Title 4 | Technology Area 1 | | | | N/A | | 2 | | | | |

| P.A. | Int. | Ext. | Co. | | Deal Valuation (4) | Deal Evaluations (0) | Portfolio Requests (0) | Portfolio Evaluations (0) |
|---|---|---|---|---|---|---|---|---|

| | | | Deal △ | E/B | Comp. | Inc. | Assets | Valuation Due |
|---|---|---|---|---|---|---|---|---|
| PA 1 Business Unit 1 | 2 | | Deal 1 | Basic | 0 | 1 | 1 | 12/31/2009 |
| PA 2 Business Unit 2 | 26 | | Deal 2 | Basic | 0 | 2 | 11 | 12/31/2009 |
| PA 3 Business Unit 3 | 17 | | Deal 3 | Basic | 0 | 1 | 1 | 12/31/2009 |
| PA 4 Business Unit 4 | 20 | | Deal 4 | Elite | 0 | 0 | 29 | 12/31/2009 |
| PA 5 Business Unit 5 | 24 | | | | | | | |
| PA 6 Investors | 6 | | | | | | | |

Deal 2   ☐ Basic

| Valuation Requested | Valuation Due | Complete TAS | Incomplete TAS | Assets |
|---|---|---|---|---|
| 12/31/2009 | 12/31/2009 | 0 | 2 | 7/11 |

| Rules Submission Date | Entity Total Rules Value | Entity Total PA Value | Entity Total Value |
|---|---|---|---|
| 12/31/2009  ⌐1401 | $5,000 | N/A | $5,000  ⌐1410 |

| Values DashBoard | TAS Management |
|---|---|

| Rules Values | PA Values | Asset # | Type | Title | Request TAS ☐ | Valuation Complete | ☒ Import Val |
|---|---|---|---|---|---|---|---|
| | | 4,000,000 | US Pat | Title 1 | | | |
| 500 | | 4,000,001 | US Pat | Title 2 | | | |
| | | 4,000,002 | US Pat | Title 3 | | | |
| 1,000 | | 4,000,003 | US Pat | Title 4 | | | |

*FIG. 14*

| P.A. | Int. | Ext. | Co. |
|---|---|---|---|

| | |
|---|---|
| PA 1 Business Unit 1 | 2 |
| PA 2 Business Unit 2 | 26 |
| PA 3 Business Unit 3 | 17 |
| PA 4 Business Unit 4 | 20 |
| PA 5 Business Unit 5 | 24 |
| PA 6 Investors | 6 |

1105

| Deal Valuation (4) | Deal Evaluations (0) | Portfolio Requests (0) | Portfolio Evaluations (0) |
|---|---|---|---|

| Deal △ | E/B | Comp. | Inc. | Assets | Valuation Due |
|---|---|---|---|---|---|
| Deal 1 | Basic | 0 | 1 | 1 | 12/31/2009 |
| Deal 2 | Basic | 1 | 1 | 11 | 12/31/2009 |
| Deal 3 | Basic | 0 | 1 | 1 | 12/31/2009 |
| Deal 4 | Elite | 0 | 0 | 29 | 12/31/2009 |

Deal 2   ☐ Basic

| Valuation Requested | Valuation Due | Complete TAS | Incomplete TAS | Assets |
|---|---|---|---|---|
| 12/31/2009 | 12/31/2009 | 1 | 1 | 7/11 |

| Rules Submission Date | Entity Total Rules Value | Entity Total PA Value | Entity Total Value |
|---|---|---|---|
| 12/31/2009 | $5,000 | $114,500 | $114,500 |

| Values DashBoard | TAS Management |
|---|---|

1505

| Rules Values | PA Values | Asset # | Type | Title | Request TAS | Valuation Complete | Import Val |
|---|---|---|---|---|---|---|---|
| | 20,000 | 4,000,000 | US Pat | Title 1 | | | |
| 500 | 4,500 | 4,000,001 | US Pat | Title 2 | | | |
| | 35,000 | 4,000,002 | US Pat | Title 3 | | | |
| 1,000 | 50,000 | 4,000,003 | US Pat | Title 4 | | | |
| | 1,000 | 4,000,004 | US Pat | Title 5 | | | |

*FIG. 15*

| P.A. | Int. | Ext. | Co. | Deal Valuation (160) | Deal Evaluations (10) | Portfolio Requests (0) | Portfolio Evaluations (0) |

| | | | Deal | E/B | Comp. | Inc. | Assets | Valuation Due |
|---|---|---|---|---|---|---|---|---|
| PA 1 | 2 | | Deal 1 | Basic | 0 | 2 | 56 | 12/31/2009 |
| Business Unit 1 | | | Deal 2 | Basic | 1 | 1 | 11 | 12/31/2009 |
| | | | Deal 3 | Elite | 0 | 0 | 1 | 12/31/2009 |
| PA 2 | 26 | | Deal 4 | Basic | 0 | 20 | 22 | 12/31/2009 |
| Business Unit 2 | | | Deal 5 | Basic | 0 | 0 | 1 | 12/31/2009 |
| | | | Deal 6 | Basic | 0 | 0 | 1 | 12/31/2009 |
| PA 3 | 17 | | Deal 7 | Basic | 0 | 1 | 256 | 12/31/2009 |
| Business Unit 3 | | | Deal 8 | Elite | 0 | 0 | 9 | 12/31/2009 |
| | | | Deal 9 | Basic | 0 | 1 | 2 | 12/31/2009 |
| PA 4 | 20 | | Deal 10 | Elite | 0 | 0 | 1 | 12/31/2009 |
| Business Unit 4 | | | Deal 11 | Basic | 0 | 0 | 1 | 12/31/2009 |

1105

Deal 2   ☐ Basic

| Valuation Requested | Valuation Due | Complete TAS | Incomplete TAS | Assets |
|---|---|---|---|---|
| 12/31/2009 | 12/31/2009 | 1 | 1 | 7/11 |

| Rules Submission Date | Entity Total Rules Value | Entity Total PA Value | Entity Total Value |
|---|---|---|---|
| 12/31/2009 | $5,000 | $114,500 | $114,500 |

PA 5  24
Business Unit 5

PA 6  6
Investors

| Values Dashboard | TAS Management |

| Rules Values | PA Values | Asset # | Type | Title | Valuation Complete |
|---|---|---|---|---|---|
| ▼ | 20,000 | 4,000,000 | US Pat | Title 1 | |
| ▲ 500 | 4,500 | 4,000,001 | US Pat | Title 2 | |

Rule: New Rule ⌒1610
Indep. Claims: 6
Deal 1    Dep. Claims: 52    Assignee:

| Date Completed | Current Value | Key Valuation | Current Use | Future Use | Special Consideration | Related Family |

| Marketing Info | | Costs | |
|---|---|---|---|
| Region: | US & Canada | Upfront Price: | |
| Segment: | Business | PerApp Issuance Fee: | |
| Competitor: | | Other Costs: | |
| Technology Area(s): | | Total Finder's Fee: | $0 |
| Licensee(s): | | Acquisition Cost: | |
| | | Cost Per Asset: | |
| | | Profit Participation: | % |

Historical Deal Notes (0)

TCLs — Assets

|  | Kno. | Est. | Total |
|---|---|---|---|
| LP1 | 11 | 0 | 11 |
| LP2 | 11 | 0 | 11 |
| LP3 | 11 | 0 | 11 |

630

|  | Active | | | Expired | | | Totals | | |
|---|---|---|---|---|---|---|---|---|---|
|  | Kno | Est | Tot | Kno | Est | Tot | Kno | Est | Tot |
| US Patents: | 11 | 0 | 11 | 0 | 0 | 0 | 11 | 0 | 11 |
| US Applications: | 0 | 0 | 0 | 0 | 0 | 0 | 0 | 0 | 0 |
| International Patents: | 0 | 0 | 0 | 0 | 0 | 0 | 0 | 0 | 0 |
| International App's: | 0 | 0 | 0 | 0 | 0 | 0 | 0 | 0 | 0 |
| Totals: | 11 | 0 | 11 | 0 | 0 | 0 | 11 | 0 | 11 |

SAVE AND MANAGE ASSETS — 915 — 435

▼ Pricing  Status: Rules Completed  Date: 12/31/2009  [Review Hits] [Submit to Rules]

Classification: Basic
Valuation Due Date: 12/31/2009

905:
| Business Unit | Business Unit 1 | Business Unit 2 | Business Unit 3 | Business Unit 4 | Business Unit 5 | Investors |
|---|---|---|---|---|---|---|
| No. of Assets with Rule Hits | 0 | 7 | 9 | 2 | 0 | 0 |
| No. of Assets without Rule Hits | 11 | 4 | 2 | 9 | 11 | 11 |
| Entity Total Value | $0 | $114,500 | $120,000 | $0 | $0 | $0 |
| Per Asset | $0 | $16,357 | $13,333 | $0 | $0 | $0 |
| Distinct Interest | 0.00% | 100.00% | 81.82% | 18.18% | 0.00% | 0.00% |
| Deal % $s | 0.00% | 48.83% | 51.17% | 0.00% | 0.00% | 0.00% |

910:
| Total Value | $234,500 |
|---|---|
| Number of Assets Submitted | 11 |
| Distinct Interest Asset Count | 10 |
| Asking Price | $1,000,000 |

▼ Technology  Elite / TAS Complete for All Assets

*FIG. 17A*

ACQUIRING INTELLECTUAL PROPERTY ASSETS

CROSS-REFERENCE TO RELATED APPLICATIONS

This application is a continuation of U.S. patent application Ser. No. 13/113,964 filed May 23, 2011 (entitled ACQUIRING INTELLECTUAL PROPERTY ASSETS), which is a continuation of U.S. patent application Ser. No. 12/869,686 filed Aug. 26, 2010 (entitled ACQUIRING INTELLECTUAL PROPERTY ASSETS), which claims priority to and the benefit of U.S. Provisional Patent Application No. 61/237,241 filed Aug. 26, 2009 (entitled ACQUIRING INTELLECTUAL PROPERTY ASSETS), and U.S. Provisional Patent Application No. 61/326,207 filed Apr. 20, 2010 (entitled ACQUIRING INTELLECTUAL PROPERTY ASSETS), each of which is incorporated by reference herein in its entirety.

TECHNICAL FIELD

The present disclosure is generally directed toward automatic processes for acquiring intellectual property assets.

BACKGROUND

Intellectual property assets, such as U.S. patents, U.S. patent applications, non-U.S. patents, and non-U.S. patent applications, are generally transferable. Accordingly, it can be desirable in some circumstances to acquire existing intellectual property assets.

BRIEF DESCRIPTION OF THE DRAWINGS

FIG. 6 is a display diagram showing a sample display presented by the facility in connection with acquiring intellectual property assets in some embodiments.

FIGS. 9 and 10 are display diagrams showing sample displays presented by the facility in connection with displaying values for intellectual property assets in some embodiments.

FIGS. 11-16 are display diagrams showing sample displays presented by the facility in connection with receiving values for intellectual property assets based upon manual analysis of the intellectual property assets in some embodiments.

FIGS. 17A and 17B are display diagrams showing sample displays presented by the facility in connection with displaying values for intellectual property assets in some embodiments.

DETAILED DESCRIPTION

Figure 1:
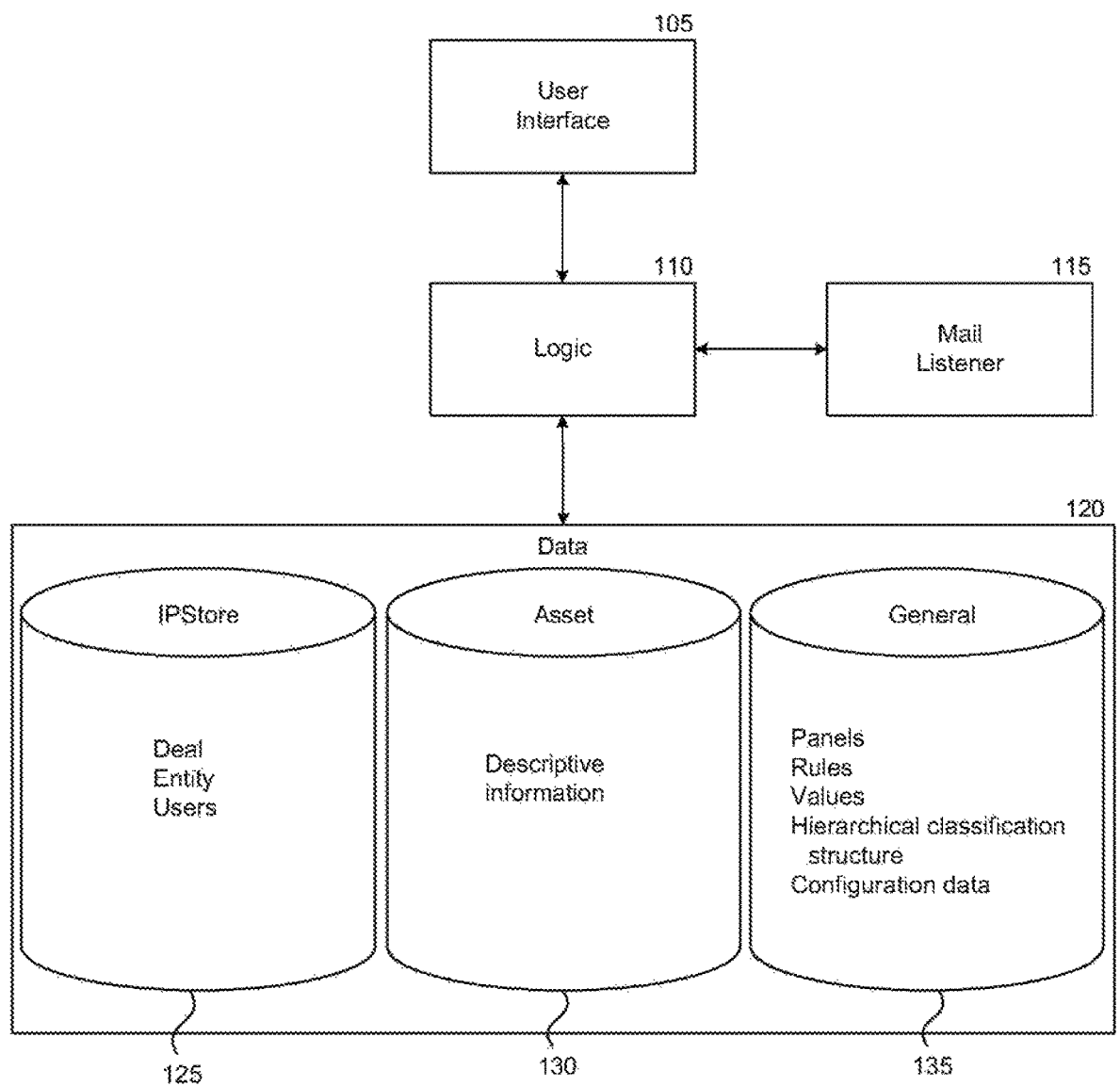
FIG. 1 is a block diagram showing an architecture employed by a facility for facilitating process for acquiring intellectual property assets in some embodiments.

The inventors have recognized that conventional processes for acquiring intellectual property assets pose several problems. A first problem is that if multiple entities are interested in together acquiring intellectual property assets, or if a single entity is interested in an intellectual property asset for the benefit of multiple entities—such as subsidiaries or business divisions—it can be difficult to determine an overall budget for acquiring the intellectual property assets. A second problem is that if the intellectual property assets are acquired, it can be difficult to allocate costs associated with acquiring the intellectual property assets among the multiple entities. A third problem is that because that the number of intellectual property assets in a potential acquisition may be quite large, it can be difficult to select the intellectual property assets on which valuation and/or due diligence resources of the multiple entities should be focused.

A hardware, firmware, and/or software facility ("facility") for facilitating processes for acquiring intellectual property assets ("assets") is described. In some embodiments, the facility enables an organization operating the facility (for example, a company) to determine a budget for acquiring assets. A budget is an amount allocated for acquiring assets. For example, the organization may include multiple entities that are each interested in acquiring the assets. An entity is something that has a distinct, separate existence, examples of which are human individuals, groups of individuals, and organizational units, such as business units within a company or separate companies that are affiliated in some way, such as all being the direct or indirect subsidiaries of the same company. The entities may each provide values for the assets, either by applying rules that automatically attribute values to the assets, by having individuals manually analyze the assets to estimate their values, or by some combination of these two techniques.

Each entity has associated with it one or more rules that the facility applies to assets in order to automatically attribute values to the assets. A rule is a logical construct that consists of one or more criteria and a value. When the facility applies a rule to an initial set of assets, the facility applies the rule's criteria to each of the assets of the initial set and produces a result set of assets that each satisfy the rule's criteria. The facility also attributes the rule's value to each of the assets of the result set on behalf of the entity with which the rule is associated. Rules enable entities to automatically value assets without committing human people to manually perform the valuation. Among other things, this enables the entities to devote resources to other assets that have not been automatically valued by rules. As used herein, to describe that two things are associated describes that the first thing may be ascertained from the second thing. For example, entities are associated with rules, meaning that given a specific entity, the rules associated with the specific entity can be ascertained. Given a specific rule, the entity with which it is associated can also be ascertained.

Each entity also has associated with it one or more individuals who perform various functions for the entity. For example, each entity has associated with it individuals who create rules on behalf of the entity. Other individuals include people who analyze assets, people who lead proposed acquisitions of assets, people who perform due diligence on assets, people who manage valuations of assets, and others. In some embodiments, a rule can directly or indirectly identify a person to whom assets in the rule's result set are to be automatically routed, so that the people may manually analyze the assets. People who analyze assets are sometimes referred to as analysts. The analyst to whom an asset is routed may attribute a value to the asset based upon their manual analysis of the asset. An analyst may also value assets that have not been automatically routed to the analyst. An analyst may also provide a value for an asset that has been valued by rules, and the analyst-provided value may replace, override, or otherwise have priority over the value provided by rules.

These two techniques for valuing assets are not mutually exclusive, and some combination of the two may be used to value a set of assets. For example, certain assets in the set may have values provided by rules, and others provided by analysts. As another example, certain assets may have values attributed by rules that are overridden by values provided by analysts. The facility uses the values provided by the multiple entities to determine a budget for acquiring the assets. For example, a first entity may provide a first value based on rules and/or manual analysis for the set of assets, a second entity may provide a second value based on rules and/or manual analysis for the set, and the facility may sum the two values to obtain a total value for the set. The facility uses the total value as the budget for acquiring the set of assets.

Other entities may also provide values for the assets. For example, the organization operating the facility may use the facility to acquire assets on behalf of a fund in which one or more investors are invested. The investors may provide values for the assets according to their levels of interest in the assets. Additionally or alternatively, valuations may be performed for or on behalf of the investors, either by application of rules to the assets or by manual analysis of the assets. The valuations of the other entities may result in increasing the budget for acquiring the set of assets.

The budget may be also increased by an amount from a discretionary account that may be used to close acquisitions of assets. For example, a team of one or more persons that is leading an effort to acquire assets may have access to an account that contains funds that may be used, at the discretion of the team, to supplement the budget in order to bring the effort to fruition.

In some embodiments, determining a budget for acquiring assets has several aspects. The first aspect involves determining the budget based on application of multiple rules associated with multiple entities to the assets. The rules attribute values to the assets on a per-entity basis. The facility sums the values to result in a budget for acquiring the assets. An organization operating the facility may use the budget as determined by this first aspect to acquire the assets.

The second aspect involves potentially modifying the budget based upon manual analysis of the assets by the entities. The manual analysis may result in increasing the values determined by the application of rules, decreasing the values, or leaving the values unmodified. The organization may use the budget as determined by the first and/or second aspects as a basis for acquiring the assets.

The third aspect involves potentially modifying the budget based on various factors, such as levels of interest in the assets by one or more other entities, such as investors in an acquirer of the assets. The other entities may provide values for the assets. The facility may increase the budget, decrease the budget, or not modify the budget based upon the values provided by the other entities. The organization may use the budget as determined by the first, second, and/or third aspects to acquire the assets.

The fourth aspect involves potentially modifying the budget to include amounts allocated for use in acquiring assets, such as amounts from an account that contains funds that may be discretionarily used to close acquisitions of assets. This typically results in increasing the budget, although it may decrease or not modify the budget. The organization may use the budget as determined by the first, second, third, and/or fourth aspects as a basis for acquiring the assets.

In some embodiments, the facility also enables allocating expenses associated with acquiring assets among multiple entities. The facility determines expenses associated with acquiring the assets. A first entity that provided a first value for the assets that served as a basis for acquiring the assets is allocated a first portion of the expenses, based upon the first value. Similarly, a second entity that provided a second value for the assets that served as a basis for acquiring the assets is allocated a second portion of the expenses, based upon the second value. The facility can allocate additional portions of the expenses to additional entities that provided additional values for the assets that served as bases for acquiring the assets. The facility can allocate portions of post-acquisition expenses among multiple entities in a similar manner.

An organization may use the facility in a deal, which is a proposed acquisition of assets. The use of rules allows the multiple entities to automatically value certain assets in the deal, thereby allowing the multiple entities to commit human people to analyze other assets in the deal. This allows the multiple entities to segregate the potentially very valuable assets from the potentially less valuable assets, and to devote human people on the potentially very valuable assets. Users can apply the facility to generate a budget, based on both rules-based valuations and manually-determined valuations, for the deal, based on the valuations performed by the multiple entities. This allows a budget to be determined on behalf of the multiple entities. A person or team of people responsible for the deal can use the budget in negotiations to acquire the assets in the deal. If the assets are acquired, the facility can allocate acquisition and post-acquisition expenses among the multiple entities on whose behalf the assets were acquired. The multiple entities can thus together share ownership of the assets based upon the portions of the budget for which they are responsible. Accordingly, income derived from the assets can be allocated to the multiple entities based upon their portions of the shared ownership of the assets.

In some embodiments, the facility enables the assets to be acquired or potentially acquired using techniques described in U.S. patent application. Ser. No. 12/013,392 (entitled FACILITY FOR THE FINDING, ACQUISITION, AND MAINTENANCE OF INTELLECTUAL PROPERTY ASSETS) and/or U.S. patent application Ser. No. 12/009,164 (entitled TOTAL COST OF OWNERSHIP AND ACQUISITION NOTICE MANAGEMENT FOR A FACILITY FOR THE FINDING, ACQUISITION, AND MAIN- TENANCE OF INTELLECTUAL PROPERTY ASSETS), each of which is hereby incorporated by reference in its entirety.

The facility enables a valuation to be made of varied types of assets. For example, the facility enables the valuation of U.S. patents, U.S. patent applications, non-U.S. patents, and non-U.S. patent applications. The facility is not limited to enabling the valuation of the aforementioned types of assets; rather, it is also applicable to other types of assets, such as utility models, mask works, copyrights, trademarks, and trade secrets. In some embodiments, the facility may be used to acquire assets other than intellectual property assets, such as goods, services, real property assets, financial assets, and other types of non-intellectual property assets. An owner or seller of an asset may have complete title (for example, all or substantially all rights) to the asset or less than complete title to the asset (for example, less than all or substantially all rights, a fractional interest in the asset, an exclusive license to the asset, a non-exclusive license to the asset, etc.). Accordingly, acquiring an asset may include acquiring complete title to the asset or may include acquiring less than complete title to the asset (for example, acquiring a fractional interest in the asset, acquiring an exclusive license to the asset, acquiring a non-exclusive license to the asset, etc.).

Overview

FIG. 1 is a block diagram showing a high-level architecture 100 employed by the facility in some embodiments. The architecture 100 includes a user interface 105, a logic component 110, a mail listener component 115, and a data component 120. Users of the facility interact with the facility through the user interface 105. For example, the user interface receives user input, such as input specifying criteria and value to be included in rules, indications of entities and/or people to whom assets are to be automatically routed, and other user input.

Figure 2:
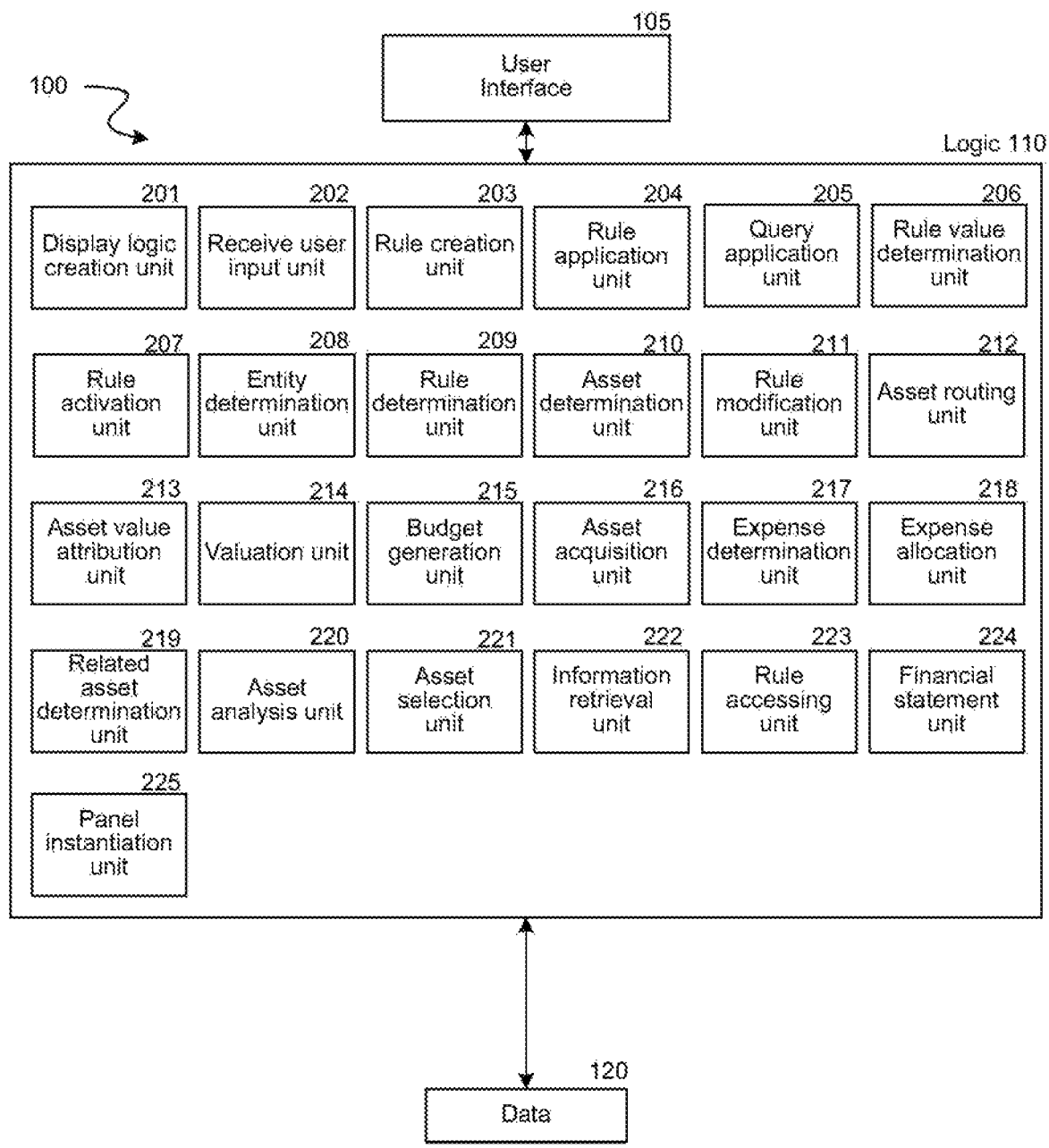
FIG. 2 is a block diagram showing a portion of the architecture illustrated in FIG. 1 in more detail.

The user interface 105 interacts with the logic component 110, which includes logic for providing and/or performing various functions described herein. Referring to FIG. 2, the logic component 110 is illustrated in more detail. The logic component 110 includes various units that may provide and/or perform the various functions described herein. For example, logic component 110 includes a display logic creation unit 201 that creates logic for display of the user interface 105. The logic component 110 also includes a rule creation unit 203 that creates rules based on input received from users, a rule application unit 204 that applies rules to assets and an asset value attribution unit 213 that attributes values to assets that satisfy rules. The logic component 110 also includes a budget generation unit 215 that generates a budget for acquiring assets, an expense determination unit 217 that determines expenses associated with acquiring assets, and an expense allocation unit 218 that allocates expenses associated with acquiring assets.

The logic component 110 also includes a receive user input 202, a query application unit 205, a rule value determination unit 206, a rule activation unit 207, an entity determination unit 208, a rule determination unit 209, an asset determination unit 210, a rule modification unit 211, and an asset routing unit 212. The logic component 110 also includes an asset value attribution unit 213, a valuation unit 214, an asset acquisition unit 216, an expense determination unit 217, a related asset determination unit 219, and an asset analysis unit 220, The logic component 110 also includes an asset selection, unit 221, an information retrieval unit 222, a rule accessing unit 224, a financial statement unit 224.

The units may provide and/or perform the various functions described herein. For example, the receive user input 202 may receive user input provided by the user other than through the user interface 105. The rule value determination unit 206 may determine values associated with rules. As another example, the asset routing unit 212 may route indications of assets to be manually analyzed to analysts. Other examples of functions that may be provided and/or performed are described herein. The units may be operably and/or communicably coupled to each other. The logic component 110 may also include units other than those illustrated in FIG. 2 that may provide and/or perform the various functions described herein. The units may be implemented in various ways described herein. Furthermore, those of ordinary skill in the art will understand that, in the context of the present disclosure and a patent- and/or a patent application-specific implementation, some, most, or all of the units illustrated in FIG. 2 could/would include the prefix "patent," "patent application," "patent-related," or "patent application-related," unless context dictates otherwise, and such prefixes were not illustrated or stated explicitly for sake of clarity.

Returning to FIG. 1, the logic component 110 interacts with the data component 120. The data component 120 includes various data stores, such as an IPStore database 125, an Asset database 130, and a General database 135, each of which can store structured and/or unstructured data. For example, the IPStore database 125 can store information about deals, entities, and/or users. As another example, the Asset database 130 can store information and metadata about assets. As another example, the General database 135 can store rules and/or values attributed to assets by rules. The mail listener 115 interacts with the logic component 110 and can receive emails and/or other messages, process them, and send emails and/or other messages responsive to received items. For example, the mail listener 115 may receive a first email that includes identifiers of one or more assets, parse the email to determine assets identified by the identifiers, request that the rule application unit 204 apply rules to the assets, receive values for the assets from the valuation unit 214, and send a second email that includes the values to the sender of the first email. In some embodiments, the mail listener 115 instead of sending the second email that includes the values may instead send the sender a link to a web page that displays the values determined by application of the rules.

Although the components in the architecture 100 are illustrated as interacting in a certain fashion, any component in the architecture 100 may interact with any other component in the architecture 100 (for example, the user interface 105 may interact with the data component 120 and vice-versa). Moreover, the user interface 105 and the data component 120 may also include logic for providing and/or performing the various functions described herein. The architecture 100 may also include authentication and authorization components and/or data to authenticate users of the facility and authorize their use of their facility based upon their role. A user's role (or roles, described as the user's "role" in singular) determines the level of access that the user may have to certain aspects of the facility. A user with a certain role may be limited to only accessing a certain aspect of the facility, whereas a user with another role may have access to all or substantially all aspects of the facility. In some embodiments, the facility uses techniques for authentication and authorization described in the previously-referenced U.S. patent application Ser. No. 12/013,392.

As previously described, an organization operating the facility may include several entities. The organization may also include several people associated with the entities and who have various roles and/or perform various functions for the entities. One example of an organization, entities, and people is that of a company, business units within the company, and people associated with the business units. The business units may represent the interests of various other parties, such as prospective licensees of assets. A person may have one or more roles, such as a leader of a team responsible for acquiring assets (a Deal Team Leader—DTL), an analyzer of assets (for example, an Internal Analyst (IA) or an External Analyst (EA)), a coordinator of asset valuations (for example, a Portfolio Architect (PA)), a creator of rules, and/or other roles. Reference to this particular example may be made throughout this disclosure for descriptive purposes. Those of skill in the art will understand, however, that the disclosure has general applicability and is not limited to this particular example.

Creating Rules

As previously described, a rule is a logical construct that consists of one or more criteria and a value. The facility applies rules to assets to automatically value the assets. Assets are associated with descriptive information. For example, a patent is associated with a specification, one or more claims, an issue date, and may be associated with other information, such as an assignee, a number that indicates how many other patents refer to the patent, and a number of months before the patent expires. Other types of assets may be associated with similar and/or different descriptive information.

Although the facility may implement rules in functional language (for example, in Structured Query Language (SQL)), rules are derived from ordinary English statements. For example, a first rule could be paraphrased as: "Attribute a value of $1,000 to all assets having a title that includes 'wireless' and an inventor named 'Smith.'" The first rule's criteria are that an asset is to have the word "wireless" in its title and at least one inventor name including the word "Smith" in order to satisfy the rule. The first rule's value is $1,000. As another example, a second rule could be paraphrased as "Attribute a value of $10,000 to all assets having a specification that includes 'semiconductor' and a UPC classification (UPC stands for U.S. Patent Classification, which is a hierarchical classification structure) of 438/107." The second rule's criteria are that an asset is to have the word "semiconductor" in its specification and its classification is to include the string "438/107" in order to satisfy the rule.

When the facility applies a rule to an initial set of assets, the facility applies the rule's criteria to the descriptive information associated with each of the assets of the initial set. The facility produces a result set of assets, each of which have associated descriptive information that satisfies the rule's criteria. The facility also attributes the rule's value to each of the assets of the result set, thereby automatically valuing each of the assets of the result set (at least where, as described further herein, the value is a non-zero numerical value). Although the value is described as being attributed to each of the assets of the result set, it is equally valid, however, to describe the rule's value, or a multiple thereof, as being attributed to the initial set of assets.

People create rules for entities, and thus a rule is associated with the entity for which the rule was created. It is common for several rules to be associated with an entity. Each of the rules may have a different value. The facility applies each of the rules to the initial set of assets, and each application may result in a different result set of assets. Therefore, application of multiple rules associated with a specific entity may result in multiple values being attributed to an asset. For example, a first rule associated with a business unit may attribute a first value of $1,000 to a first asset in the initial set of assets, and a second rule associated with the business unit may attribute a second value of $3,000 to the first asset. In general, only one of the business unit's two values is used for the asset. How the facility selects one of an entity's multiple values as the entity's value to use for the asset is described in more detail with reference to, for example, FIGS. 8-10.

Each of several entities has associated with it a set of one or more rules. For each of the several entities, the facility applies the associated set of rules to the initial set of assets. This may result in the facility attributing multiple values, each value associated with an entity, to at least one of the assets of the initial set of assets. For example, a first business unit may have a first set of rules, a second business unit may have a second set of rules, and a third business unit may have a third set of rules. The application of the first set of rules to an initial set of assets may result in the first business unit valuing a first asset at $10,000, the application of the second set of rules may result in the second business unit valuing the first asset at $100,000, and the application of the third set of rules may not result in a value of the first asset for the third business unit. In general, the three business units' values are combined in order to attribute a total value to the first asset. How the facility combines multiple values from multiple entities to obtain a total value to use for an asset is described in more detail with reference to, for example, FIGS. 8-10.

Figure 3:
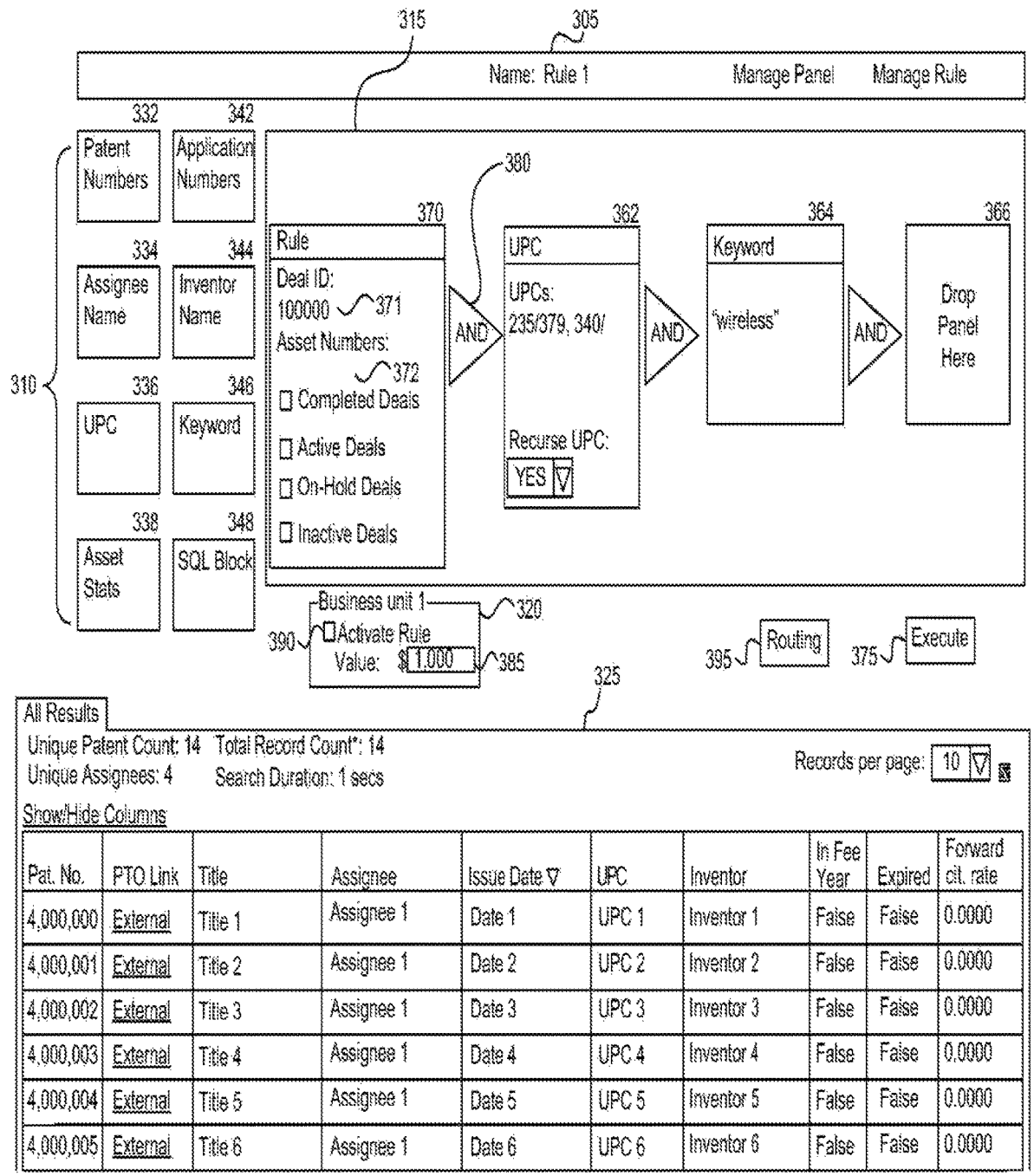
FIGS. 3 and 4 are display diagrams showing sample displays presented by the facility in connection with creating a rule in some embodiments.

FIG. 3 is a display diagram showing a display 300 presented by the facility that enables users of the facility to create rules. The display 300 includes five primary regions: 1) a rule name region 305 that displays a name of a rule currently being used by a user; 2) a panel palette region 310 that includes a number of panels that are available to users of the facility; a workspace region 315 in which rule criteria can be assembled or modified and an initial set of assets specified; 3) a value region 320 in which a value can be specified, that will be attributed to assets satisfying the rule criteria, and a results region 325 that displays a result set of assets that satisfy the rule criteria. The rule name region 305 also provides menu options for managing panels and rules; such options may include creating new panels and rules, modifying panels and rules, deleting and/or disabling panels and rules, saving panels and rules, viewing properties of panels and rules, and sharing panels and rules. The display 300 shares elements with displays described in U.S. patent application Ser. No. 12/626,467 (entitled SELECTING INTELLECTUAL PROPERTY ASSETS), which is hereby incorporated by reference in its entirety. Therefore, certain elements of the display 300 are described only summarily herein, and reference should be made to U.S. patent application Ser. No. 12/626,467 for a more in-depth description of these elements. (U.S. patent application Ser. No. 12/626,467 describes creating filters. A filter shares some similarities with a rule in that a filter typically includes one or more criteria that are applied to an initial set of assets to produce a result set of assets. However, there are differences between filters and rules.)

The panel palette region 310 includes a number of panels that are available to users of the facility. As shown here, these panels include: 1) a patent numbers panel 332; 2) an assignee name panel 334; 3) a UPC panel 336; 4) an asset stats panel 338; 5) an application numbers panel 342; 7) an inventor name panel 344; 8) a keyword panel 346; and 8) a SQL block panel 348. The logic for creating the display 300 and other displays described herein may be created by, for example, the display logic creation unit 201 based on, for example, configuration data stored in, for example, the General database 135. The display 300 and the other displays described herein may be provided by, for example, the user interface 105.

A user specifies one or more criteria for a rule by dragging and dropping one or more panels from the panel palette region 310 into the workspace region 315. Doing so creates an instance of the panel in the workspace region 315. In FIG. 3, an instance 362 of a UPC panel and an instance 364 of a keyword panel are in the workspace region 3615, as well as a placeholder 366 indicating where another instance of a panel may be placed. Panel instances 362 and 364 are joined by a boolean operator "AND" 380. Other boolean operators, such as "OR" and/or "NOT," may also be used to join panels in the workspace region 315. In some embodiments, the boolean operators may be changed or toggled (for example, from "AND" to "NOT" to "OR," etc.) by the user's clicking on the boolean operator 380. The user's input (for example, dragging and dropping a panel) may be received by, for example, the user interface 105 and/or the receive user input unit 202.

Panels include parameters that accept values. For example, the patent numbers panel 332 includes a parameter that accepts patent numbers as values. As another example, the SQL block panel 348 includes a parameter that accepts as a value a string of SQL text. Each panel instance has a query associated with or corresponding to it that the facility produces upon receiving values for its parameter(s), or in some cases, upon parameterization of a panel instance. When the facility applies a rule, the first panel instance of the rule acts upon a specified initial set of assets to form a first intermediate set of assets, which is acted upon by the second panel instance to form a second intermediate set of assets, and so on, until a result set of assets is produced. More details as to techniques the facility may use to form queries and produce the result set of assets may be found in the previously-referenced U.S. patent application Ser. No. 12/626,487. A rule may be applied by, for example, the rule application unit 204. A query may be applied to a set of assets by the query application unit 205. Accordingly, the rule application unit 204 may communicate with the query application unit 205 to apply a rule.

The workspace region 315 also includes a region 370 in which a user can specify an initial set of assets that can be used to test the criteria specified in the workspace region 315. The region 370 does not form part of the rule; rather, the region 370 allows the user to provide a context for the rule for purposes of testing the rule. The user can specify the initial set of assets in several ways: 1) the user can specify a deal with which a specific set of assets is associated by providing a deal number in region 371; 2) the user can specify one or more assets by number (for example, patent number, patent application number, etc.) in region 372; and/or 3) the user can specify that assets associated with deals corresponding to one or more of several deal stages (completed, active, inactive, on hold, etc.) are to be used via corresponding checkboxes. The assets as directly or indirectly specified by the user in region 370 form the initial set of assets to which the one or more criteria specified by the panel instances are applied. The user's input in specifying the assets may be received by, for example, the user interface 105 and/or the receive user input unit 202.

The user can test the criteria specified in the workspace region 315 by selecting the button 375 labeled "Execute." Doing so applies the criteria to the descriptive information associated with each of the assets in the specified initial set of assets, and produces a result set of assets, which is displayed in results region 325 in tabular form. Information about one or more assets in the result set can be displayed, such as a patent number (for example, a number of a U.S. patent), an assignee of the asset, and a forward citation rate of the asset (for example, the number of times the asset is cited in a period of time over the period of time). The listing of assets in the results region 325 allows the user to view the assets that satisfy the one or more criteria specified in the workspace region 315. This may allow the user to obtain a sense of assets that may result from application of a rule containing such criteria as well as how a rule containing such criteria would actually value the assets. For example, the user may wish to test the criteria against already purchased assets to determine if the rule would have resulted in purchasing any or all of the already purchased assets. The rules may also be tested against pre-determined values associated with already purchased assets, such as pre-determined numerical values or values that indicate a level of importance to a particular entity. The users input in testing the rule may be received by, for example, the user interface 105 and/or the receive user input unit 202.

The value region 320 enables a user to specify a value to be attributed to a result set of assets. The user does so by providing a value in text box 385. The user's providing of one or more criteria and a value allows the facility to create a rule containing the provided criteria and value. In some embodiments, the facility attributes the specified value to each of the assets in the result set. In some embodiments, the user specifies an amount that the facility allocates to all of the assets in the result set, meaning that the facility divides the amount equally among the assets and attributes the divided amount to each asset in the result set. The value region also includes a checkbox 390 that enables the user to indicate that the rule is to be activated. Once the facility activates a rule, the facility can apply the rule to assets in a deal, and its application will result in the facility automatically attributing the specified value to any asset in the deal that satisfies the one or more criteria specified in the rule. The facility associates the rule with the entity that is associated with the user who created the rule. In some embodiments, the facility does not allow users to create rules for entities other than the entity with which the user is associated. In some embodiments, the facility allows users to create rules for entities other than the entity with which the user, is associated. The user's input in specifying the value and activating the rule may be received by, for example, the user interface 105 and/or the receive user input unit 202. A rule may be created by, for example, the rule creation unit 203.

As described in more detail herein, the values attributed by rules are used to generate a budget for acquiring the assets. The value specified by a user is associated with the entity associated with the user that created the rule. The facility can use the values associated with multiple entities to generate a budget for acquiring the assets. Therefore, the value that a rule specifies for an asset may consist of the entity's financial contribution to the purchase price of the asset. In this fashion, rules assist in determining a budget for acquiring the assets in the deal. Moreover, the facility can also use the specified value as a basis for determining a portion of the expenses associated with acquiring the asset that should be allocated to the entity.

The facility also enables users to specify that assets that satisfy rules are to be automatically routed to one or more entities and/or persons so that the assets may be manually analyzed to determine their values. The facility does so by allowing users to specify that certain rules are to have a zero value. In lieu of specifying a non-zero value for an asset in the value region 320, the user instead specifies that the value is zero. For rules where the specified value is zero, the facility automatically routes an indication of assets satisfying the rules to the entities and/or persons with which the rules are associated. For example, the facility may automatically route an indication of the assets that satisfy a zero-value rule to the entity associated with the user that created the rule. The entity may then route the indication to one or more persons for manual analysis of the assets. As another example, the facility may automatically route an indication of the assets that satisfy a zero-value rule to the user that created the rule.

In some embodiments, the facility allows users to select one or more entities and/or persons to whom assets are to be automatically routed. The display 300 includes a button 395 labeled "Routing" that enables a user to select the entities and/or persons to which an indication of the assets that satisfy a zero-value rule is to be routed.

Figure 4:
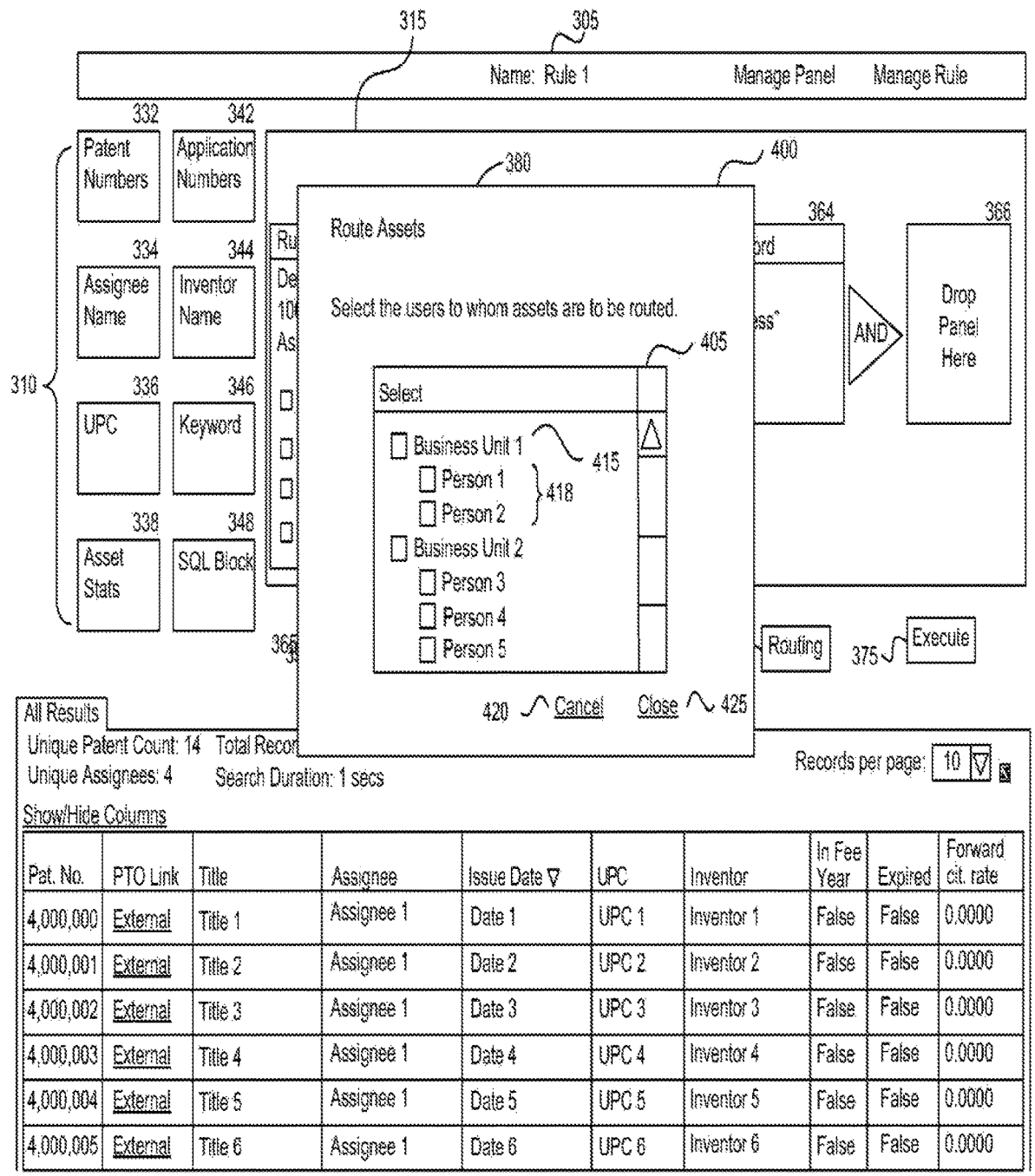

FIG. 4 is a display diagram showing a display 400 presented by the facility that enables users to specify entities and/or users to which indications of assets satisfying rules should be routed. The facility may present the display 400 when the user selects the "Routing" button 395, or upon receiving a zero value specified in text box 385. The display 400 includes a region 405 in which the user can select a business unit 415 or a person 418 to which the indication should be routed. After making a selection, the user can cancel the selection by selecting button 420 or save the selection by selecting button 425. For rules where the specified value is zero, the facility automatically routes an indication of assets that satisfy the zero-value rule to the selected business unit 415 or person 418. In some embodiments, the facility allows the user to select more than one business unit and/or more than one person to which the indication should be routed, and the facility provides each selected business unit and/or person with an indication of the assets that satisfy the zero-value rule.

In some embodiments, instead of specifying a numerical value in the value region 320, a user may instead specify identifiers of one or more entities and/or persons (for example, one or more names of one or more entities and/or persons, one or more email addresses of one or more entities and/or persons, etc.) in the value region 320. Upon application of such a rule, the facility automatically routes assets satisfying the rule to the entities and/or persons identified in the value region 320.

In some embodiments, the facility allows users to specify both a numerical value to be attributed to assets as well as identifiers of entities and/or persons to whom assets are to be automatically routed. For example, a user may desire to create a rule that attributes a value to an asset satisfying the rule as well as automatically route the asset to one or more entities and/or persons for analysis of the asset. In such embodiments, the user may specify a numerical value in the value region 320 as well as specify identifiers of one or more entities and/or persons to be associated with the rule. Upon application of such a rule, the facility both automatically attributes the value to assets satisfying the rule and automatically routes the assets satisfying the rule to the identified one or more entities and/or persons.

As described herein, an entity may be responsible for one or more technology areas, and the people associated with the entity may have expertise in such technology areas. Additionally or alternatively, individuals that are not associated with the entity may have expertise in the entity's technology area. The techniques described herein allow a creator of a rule to specify that assets satisfying the rule may be automatically routed to the appropriate entities and/or people such that the assets may be manually analyzed to determine values for the assets, whether or not those entities and/or people are associated with the entity on those behalf the rule was created.

Figure 5:
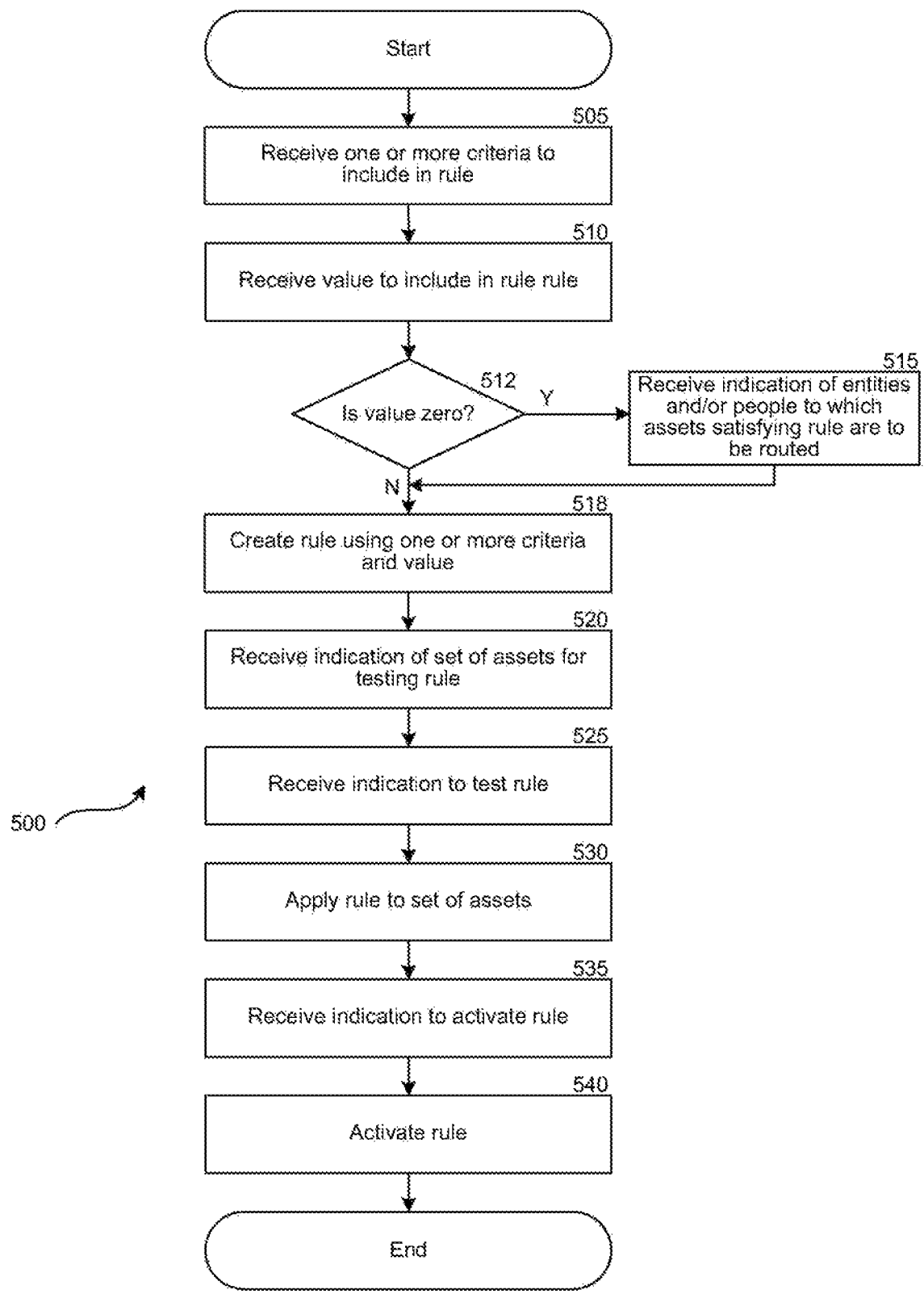
FIG. 5 is a flow diagram of a process implemented by the facility in connection with creating a rule in some embodiments.

FIG. 5 is a flow diagram of a process 500 implemented by the facility in connection with creating a rule. The process 500 begins at step 505 where the facility receives one or more criteria to include in the rule. For example, a user may specify one or more criteria using the techniques described with reference to FIGS. 3 and 4. At step 510, the facility receives a value to include in the rule (for example, a value provided by a user in the text box 385 of FIG. 3). At step 512 the facility determines whether the value is zero. This determination may be made by, for example, the rule value determination unit 206. If the rule value is zero, the process 500 branches to step 515, where the facility receives an indication of one or more entities and/or one or more people to which an indication of assets satisfying the rule should be routed (for example, the business units and/or people specified by the user via the display 400 of FIG. 4). If the value is not zero, the process 500 continues at step 518, where the facility creates the rule and stores the rule. The rule may be created by, for example, the rule creation unit 203. The rule may be stored in, for example, the General database 135.

At step 520 the facility receives an indication of a set of assets for testing the rule (for example, as indicated by the user in region 370 of FIG. 3). At step 525 the facility receives an indication to test the rule against the set of assets (for example, by receiving from the user a selection of the "Execute" button 375 of FIG. 3). At step 530 the facility applies the rule to the set of assets and displays a result set of assets that satisfy the criteria of the rule (for example, in the results region 325 of FIG. 3). At step 535 the facility receives an indication to activate the rule (for example, by receiving from the user a selection of the "Activate Rule" checkbox 390 of FIG. 3.) At step 540 the facility activates the rule by storing the rule and an indication that the rule is active. The rule may be activated by, for example, the rule activation unit 207. The facility can then apply the rule to assets to automatically value the assets.

Those skilled in the art will appreciate that the steps shown in FIG. 5 may be altered in a variety of ways. For example, the order of the steps may be rearranged; substeps may be performed in parallel; shown steps may be omitted, or other steps may be included; etc. The steps shown in the other flow diagrams described herein may also be similarly altered.

Acquiring Assets

As previously described, in some embodiments, the facility enables acquiring assets. An organization operating the facility may acquire assets in one or more deals. A deal is a proposed acquisition of assets.

FIG. 6 is a display diagram showing a sample display 600 presented by the facility in connection with acquiring assets. The display 600 is similar to displays illustrated and described in the previously-referenced U.S. patent application Ser. No. 12/013,392. The display 600 includes various regions that can be used to input, edit, and/or view various details of a deal. A deal can have one of several states: active, completed, inactive (that is, the deal is finished without having acquired the assets), or on hold. A deal is typically managed by a team led by one person, and such person is referred to herein as a Deal Team Leader (DTL).

The various regions of the display 600 include region 610 in which the DTL (or other user with the appropriate permissions) can input, edit, and/or view a deal name, a deal state, a deal owner, a deal finder, a Seller's name, an asking price, an offer price, importance, a fee, and a deal stage. The display 600 also includes a marketing info and costs region 615, in which the DTL can input, edit, and/or view a geographic region, a segment, competitors, technology areas, licensees, and other information associated with the deal, such as upfront price and other costs. The DTL can provide the information for the various regions of the display 600 at the time of creation of a deal.

The display 600 also includes a TCL region 620. The TCL region displays a number of matches for certain categories or organizations (such as investors in a fund acquiring the assets in the deal) affiliated with the organization operating the facility. The display 600 also includes an assets region 640, in which is displayed a table showing the number of active and expired U.S. patents, U.S. applications, international patents and international applications that are part of the deal. The display 600 also includes a deal metadata region 625 in which the state history (for example, completed, active, inactive, on hold, etc.) of the deal, the stage history of the deal and notes about the deal are shown. The deal stage is currently "3—Valuation," to indicate that the deal is at a stage in which assets are valued. The display 600 also includes a pricing region 630, which is shown as collapsed, but when expanded, displays information about asset values. The pricing region 630 includes a button 635 labeled "Submit to Rules." When a user selects this button 635, the facility applies rules to the assets in the deal to automatically value the assets.

Figure 7:
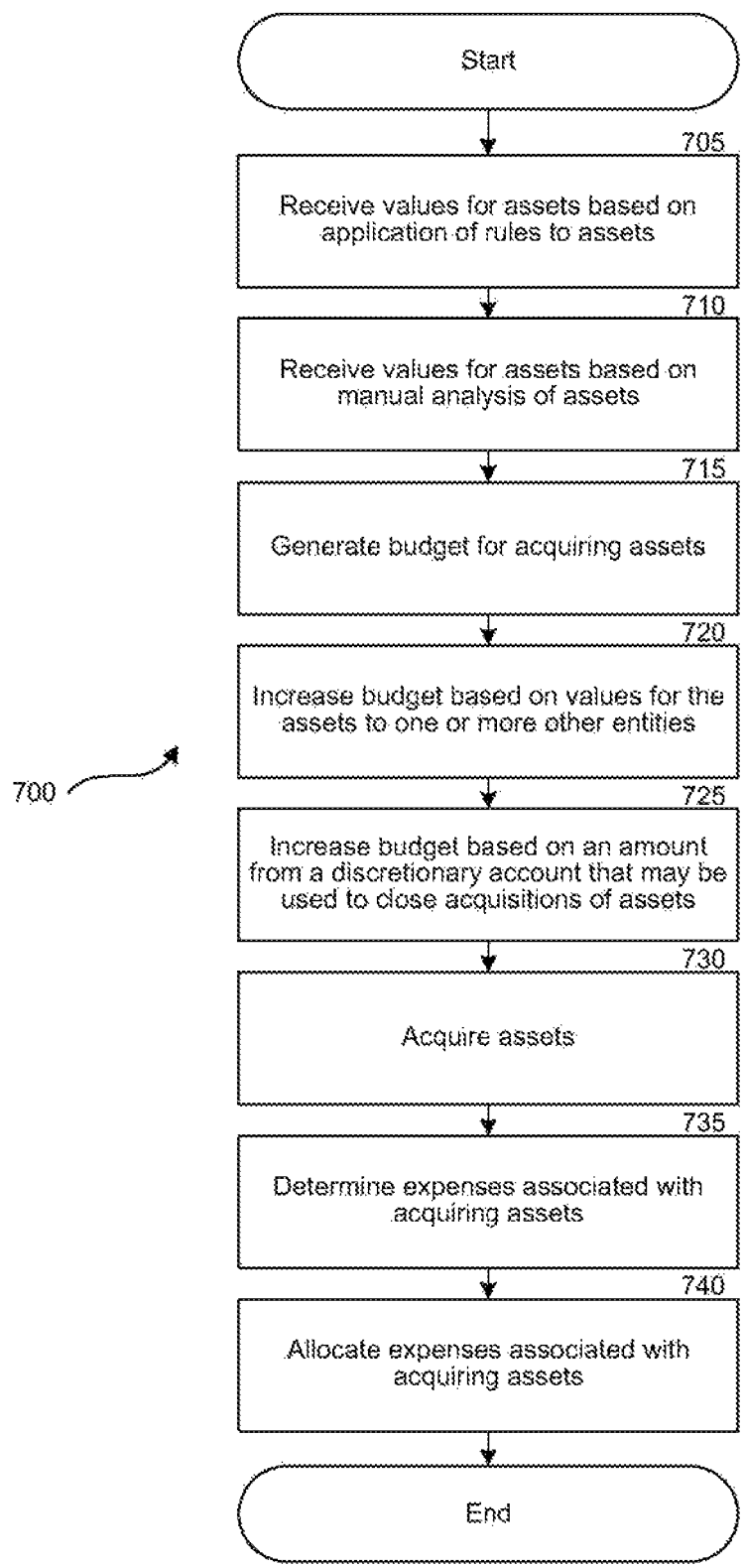
FIG. 7 is a flow diagram of a process implemented by the facility in connection with acquiring intellectual property assets in some embodiments.

FIG. 7 is a flow diagram of a process 700 implemented by the facility in connection with acquiring assets. The process 700 begins at step 705 where the facility receives values for the assets based upon the application of rules to the assets. For example, the rules-based valuation can be triggered by a user selecting the "Submit to Rules" button 635 of FIG. 6. When this button 635 is selected, the facility applies rules to the assets in the deal to attribute values to the assets. In some embodiments, the valuation by rules is performed not in response to an express request by a user, but upon creation of a deal and recognition of the assets associated with the deal. The rules-based values may be received by, for example, the valuation unit 214. At step 705 the facility also persistently stores the received values in, for example, the General database 135.

Figure 8:
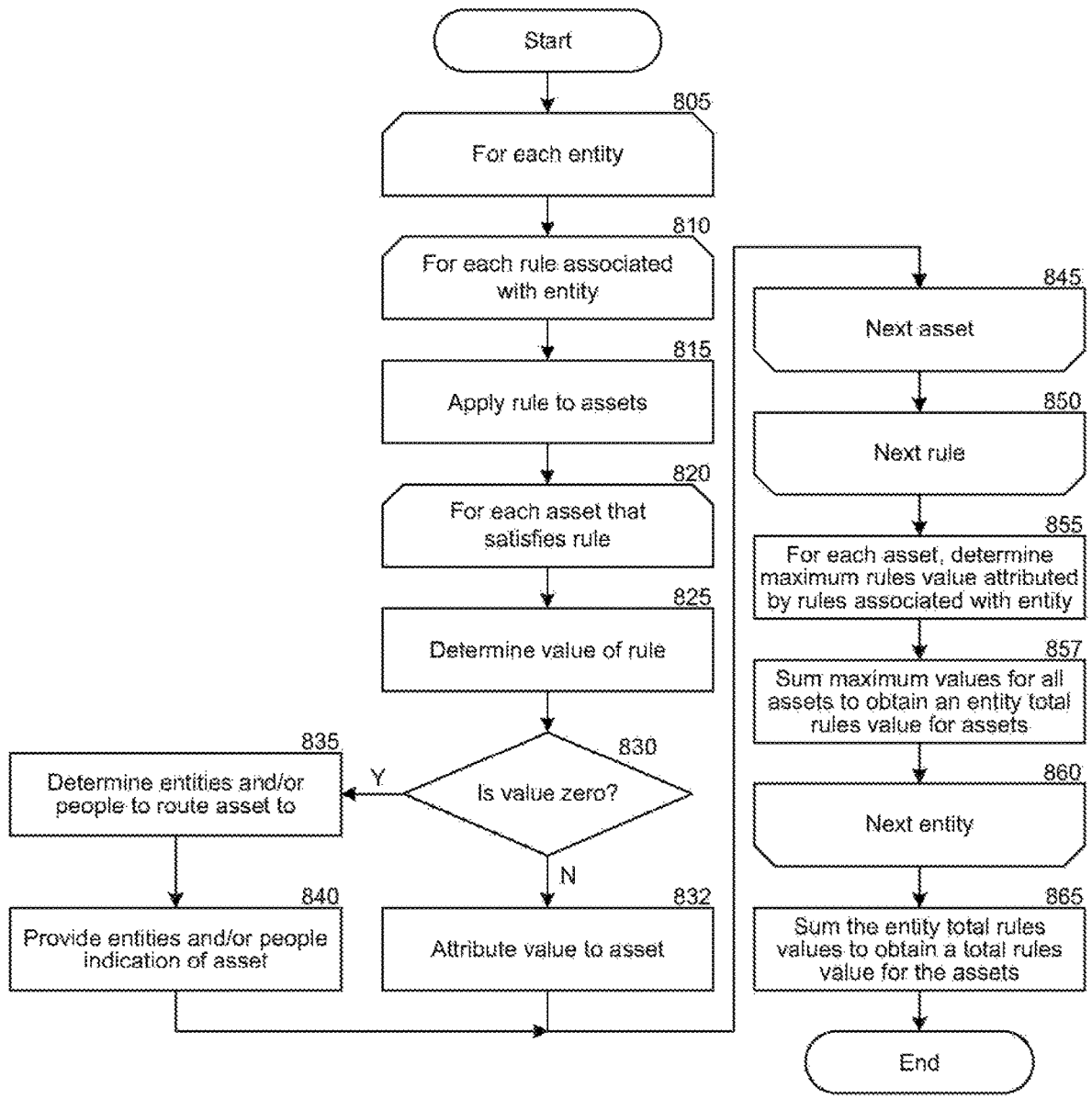
FIG. 8 is a flow diagram of a process implemented by the facility in connection with receiving values for intellectual property assets based upon application of rules to the intellectual property assets in some embodiments.

FIG. 8 is a flow diagram of a process 800 implemented by the facility in connection with applying rules to assets. The process 800 begins at step 805 where the facility determines one or more entities that have one or more rules to apply to the assets. The determination of entities may be performed, for example, by the entity determination unit 208. At step 810 the facility selects an entity and determines whether there are any rules associated with the entity. The determination of whether there are any rules may be performed, for example, by the rule determination unit 209. If the entity does not have any associated rules, the facility selects another entity.

At step 815 the facility selects a rule associated with the selected entity and applies the selected rule to the assets. This may produce a result set containing one or more assets that satisfy the selected rule or an empty set if none of the assets satisfies the selected rule. At step 820, the facility determines whether there are any assets that satisfy the selected rule. The determination of whether there are any assets may be performed, for example, by the asset determination unit 210. If there are no assets that satisfy the selected rule, the process 800 continues at step 850 (described below). If there is at least one asset that satisfies the selected rule, the process 800 continues at step 825, where the facility determines the value specified by the rule for a selected asset. The determination of the rule value may be performed, for example, by the rule value determination unit 206. At step 830 the facility determines whether the rule value is zero. If the rule value is zero, the process 800 branches to step 835, where the facility determines the entities and/or people to which an indication of the asset is to be routed for manual analysis of the asset. This determination may be performed, for example, by the asset routing unit 212. The process 800 continues at step 840, where the facility provides the determined entity and/or person an indication of the asset so that the entity and/or person can manually analyze the asset. If the value specified by the rule is not zero, then the process 800 continues at step 832 where the facility attributes the non-zero value to the asset on behalf of the entity. The value attributed to the asset on behalf of the entity is the entity rules value for the asset. The facility temporarily or permanently stores the entity rules value for the asset as well as an identification of the rule that attributed the value to the asset. The attribution of the value to the asset may be performed, for example, by the asset value attribution unit 213. At step 845, the facility determines whether there is at least one more asset that satisfies the selected rule. The determination of whether there is at least one more asset may be performed, for example, by the asset determination unit 210. If there is at least one more asset that satisfies the selected rule, the process 800 returns to step 825.

If no more assets satisfy the selected rule, the process 800 continues at step 850, where the facility determines whether there is at least one more rule associated with the entity. The determination of whether there is at least one more rule may be performed, for example, by the rule determination unit 209. If there is at least one more rule associated with the entity, the process 800 returns to step 815. If there are no more rules associated with the entity, the process 800 continues at step 855, where the facility determines, for each asset in the initial set of assets, an entity maximum rules value, which is the maximum of the values attributed to the asset by the rules associated with the entity. For example, consider the following scenario. An initial set of assets in a deal includes assets A1, A2, A3, and A4. A first business unit has associated with it rules R1, R2, and R3. Application of rule R1 to the assets of the initial set attributes $5,000 to each of assets A1 and A3. Application of rule R2 to the assets attributes $10,000 to asset A2. Application of rule R3 to the assets attributes $8,000 to each of assets A1 and A2. Asset. A4 does not satisfy any rules and therefore, is not attributed any value. Under the facts of this scenario, in step 855 the facility would determine that the entity maximum rules value for asset A1 is $8,000, the entity maximum rules value for asset A2 is $10,000, the entity maximum rules value for asset A3 is $5,000, and that there is no entity maximum rules value for asset A4. At step 857 the facility sums the entity maximum rules values for all assets to obtain an entity total rules value for the assets. Again, using the facts of this scenario, in step 857 the facility would determine that the entity total rules value for the assets A1, A2, A3, and A4 for the first business unit is $23,000 ($8,000 for A1 plus $10,000 for A2 plus $5,000 for A3). The determination of the entity maximum rules value and the entity total rules value may be performed by, for example, the valuation unit 214. The facility stores the entity maximum rules value for the asset.

The process 800 then continues at step 860, where the facility determines whether there is at least one more entity having rules to apply to the assets. The determination of whether there is at least one more entity may be performed by, for example, the entity determination unit 208. If there is at least one more entity, the process 800 returns to step 810. If there are no more entities, the process 800 continues at step 865 where the facility determines a total rules value for all the assets. The facility does so by summing all the entity total rules values for the assets. Continuing with the scenario of the previous paragraph, the first business unit's entity total rules value is $23,000. Rules associated with a second business unit could attribute values to the assets A1, A2, A3, and A4 such that the facility determines that the entity total rules value for the assets A1, A2, A3, and A4 for the second business unit is $100,000. Under these facts, at step 865 the facility would determine that the total rules value for the assets A1, A2, A3, and A4 would be $123,000 ($23,000 for the first business unit plus $100,000 for the second business unit). Additionally or alternatively, the facility could determine, for each asset, an asset total rules value attributed to the asset. This would be the sum of all the entity maximum rules values for the asset. This could be useful for example, in the situation where the organization operating the facility desires to purchase a proper subset of the set of assets in the deal. The facility could then determine the total rules value for the assets in the deal by summing the asset total rules values for all the assets. Upon conclusion of step 865, the process 800 concludes. The determination of the asset total rules value and the total rules value may be performed by, for example, the valuation unit 214.

In some embodiments, the facility iterates through the entity, rules, and assets in a manner different from that described above. For example, the facility may first select an asset, then an entity, and then apply rules associated with the entity to the selected asset, and then repeat this process for each asset. Those of skill in the art will understand that the facility may use other technologies to attribute values to assets. In some embodiments, a rule may attribute more than one value to an asset that satisfies the rule. For example, a rule may attribute a first, zero, value to an asset, indicating that an indication of the asset is to be routed to an entity for manual analysis, as well as a second, non-zero, value that is conditional, meaning that it is only used if the asset is assigned a value resulting from manual analysis.

FIG. 9 is a display diagram illustrating the pricing region 630 after the facility received values for assets in a deal that were attributed by application of rules, and before the facility has received any values for the assets based on manual analysis. This particular deal includes 11 assets. The pricing region 630 includes a first table 905 that displays values calculated based upon values attributed to the assets by rules associated with five business units and a value calculate based upon values attributed to the assets by rules associated with investors.

For each business unit and for the investors, the table 905 displays various pieces of information. The table 905 displays a number of assets that satisfy at least one rule (No. of Assets with Rule Hits) and a number of assets that do not satisfy any rules (No. of Assets without Rule Hits). The table 905 displays an entity total value. The entity total value is the total value attributed to the assets by the entity (the business unit in this example), which is the total rules value, as modified by values based on manual analysis. Because the facility has not yet received values based on manual analysis, the entity total value is only the values attributed to the assets by rules (the entity total rules value, which is calculated as described with reference to step 857 of FIG. 8). The table 905 also displays a calculated per asset amount, which is the entity total value divided by the number of assets. The table 905 also displays a calculated distinct interest, which is the number of assets given a value by at least one rule and/or by manual analysis, divided by the total number of assets in the deal. The table 905 also displays a calculated deal percentage, which is the entity total value for the assets divided by the total value for the assets. Again, because the facility has not yet received values based on manual analysis, the total value for the assets is only the total of the values attributed to the assets by the rules of all entities (the total rules value, which is calculated as described with reference to step 865 of FIG. 8).

The pricing region 630 also includes a second table 910 that displays the total value for the assets. The total value for the assets is only the total rules value because the facility has not yet received values based on manual analysis. The table 910 also displays the number of assets submitted for valuation by rules, a number of distinct assets that satisfy at least one rule, and an asking price for the assets (for example, the asking price of the seller of the assets). The pricing region 630 also includes a button 915 labeled "Review Hits" that a user can select to view values attributed by each entity for each asset. Although the tables 905 and 910 as illustrated in FIG. 9 display values obtained after only the application of rules to the assets, the tables 905 and 910 can also display these values as modified by values determined by manual analysis of the assets. For example, FIG. 17A illustrates the tables 905 and 910 after the facility has received values based upon manual analysis of the assets.

FIG. 10 is a display diagram illustrating the pricing region 630 after a user has selected the "Review Hits" button 915. The pricing region 630 includes a search region 1000 in which a user can search for assets by technology area, by asset type, by valuation type, and/or by portfolio. For the valuation type, the user can select to see assets that have been valued by rules, assets that have been valued based on manual analysis by a Portfolio Architect (PA), all assets, regardless of valuation type, as well as assets for there is no value or which a valuation has not yet been requested. The pricing region 630 also includes a table 1010 displaying assets, as well as indications of whether specific entities have valued the asset. For example, U.S. Pat. No. 4,000,000 has not been valued by any business units or by the investors, as evidenced by the checkboxes in these columns. As another example, U.S. Pat. No. 4,000,001 has been valued by Business Unit 2 and Business Unit 3, as evidenced by the values in these specific columns. A user can select the entities (in this example, the business units) that the user wants to have value an asset by selecting the checkboxes for the asset in the appropriate columns. The user may also select assets that have already been valued by an entity by selecting the value attributed to the asset by the entity. The user can then request that these entities value the selected assets by selecting the button 1005 labeled "Request Valuation." Selecting this button will send a valuation request to the valuation queue associated with the appropriate entity. The valuation request may be sent by, for example, the asset routing unit 212.

Returning to FIG. 7, as previously noted, at step 705 the facility receives values for assets based upon the application of rules to the assets. The facility may also perform other actions, such as assigning responsibility for valuation of the deal to appropriate business units, assigning responsibility for valuation of specific assets to appropriate people, and sending notifications to persons responsible for such valuations. After step 705, the process 700 continues at step 710, where the facility receives multiple values for the assets that are based upon manual analysis of the assets. Analysts associated with the multiple entities may manually analyze the assets to obtain values for the assets. The analysts may value assets that had values attributed by rules and/or assets that were not attributed values by rules. The analyst-determined values may override, replace, or otherwise have priority over values provided by rules. For example, a business unit's rules may automatically attribute a value of $10,000 to a patent. An analyst may manually analyze the patent and assign a higher value to the patent, such as $100,000. Alternatively, the analyst may lower the value or leave the value unchanged. In each case, the manually-assigned value of the patent will override the value attributed by the rules. Accordingly, a value for an asset determined by an analyst's manual analysis of the asset will override a value for the asset attributed by rules. A users input in specifying Values based on manual analysis may be received by, for example, the user interface 105 and/or the receive user input unit 202. Additionally or alternatively, the values may be received by, for example, the valuation unit 214. At step 710 the facility also persistently stores the received values in, for example, the General database 135.

A request to perform a valuation of assets by manual analysis may be triggered in several ways. For example, referring to the display diagram illustrated in FIG. 10, a user may request that one or more business units perform a manual valuation of one or more assets by selecting one or more assets and one or more business units, and by selecting the "Request Valuation" button 1005. As another example, the facility may route indications of assets that satisfy rules that attributed a zero value to the assets to analysts for manual analysis. The routing of indications may be performed by, for example, the asset routing unit 212.

FIG. 11 is a display diagram illustrating a display 1100 that illustrates a deal valuation queue. The display 1100 includes a region 1105 in which information about multiple deals is shown, such as the deal name, an indication of whether the deal is classified as elite or basic, a number of assets in the deal, and a date by which the valuation of the assets in the deal is due: The display 1100 may also provide other information about deals, such as a one of five valuation statuses about deals: 1) New—where no TAS assigned yet by the PA; 2) Analysis Outstanding—where at least one TAS is assigned by at least one business unit, and where not all TAS are complete; 3) Analysis Complete—where all TAS for all business units are complete and at least one TAS for investors is outstanding; 4) All Analysis Complete—where all TAS are complete, but the deal status has not yet been changed to valuation complete; and 5) Valuation Complete—where the deal status has been changed to valuation complete. The other information may also include a date that the valuation was requested.

The display 1100 also includes a region 1110 displaying people associated with entities within the organization operating the facility. In the display 1100, the people are Portfolio Architects (PAs), and each PA is associated with a business unit. Each PA listed may be responsible for managing a valuation queue of the person's respective business unit. For example, PA 1 may be responsible for Business Unit 1, PA 2 may be responsible for Business Unit 2, PA 3 may be responsible for Business Unit 3, and so forth. PA 6 may be responsible for managing a valuation queue associated with one or more investors in a fund acquiring the assets. There may be a one-to-many correspondence between PAs responsible for valuations and the deals, or there may be a many-to-many relationship between the PAs responsible for valuations and the deals, in that multiple PAs may share responsibility for performing valuations of assets in a particular deal. The region 1100 also displays tabs corresponding to Internal Analysts (IA)—people internal to the organization who perform analysis, External Analysts (EA)—people external to the organization who perform analysis, and Companies (CO)—external organizations that perform analysis.

Figure 12:
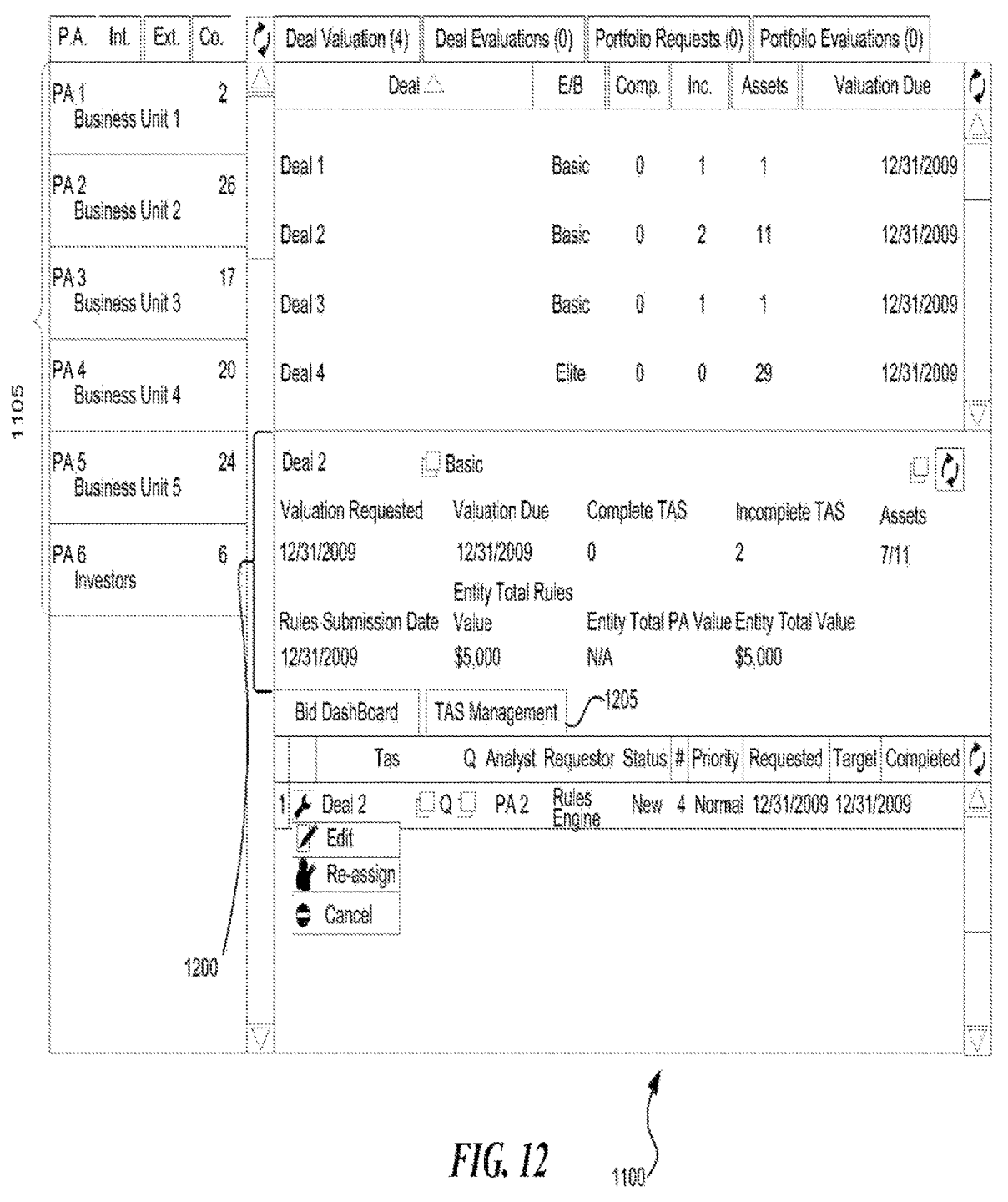

FIG. 12 is a display diagram illustrating the display 1100 after PA 2 has been selected, in order to show the deals for which PA 2 is responsible for valuing assets. As depicted, PA 2 is responsible for valuing 26 deals, of which Deals 1-4 are displayed. The display 1100 also includes a region 1200 that depicts information about a selected deal, such as the deal name, the date the valuation was requested, the date valuation is due, an entity total rules value determined by the application of the business units rules to the assets, an entity total manual value determined by manual analysis of the assets, an entity total value, a number of assets in the deal, a number of Technical Analysis Spreadsheets (TAS) that have been completed, and a number of TAS that are incomplete A TAS is a record of an analysis of one or more assets that may include estimated values for the assets. The display 1100 also includes a TAS Management region 1205, which allows a user to assign or reassign responsibility for valuing assets in the deal. For example, the TAS requested for Deal 2 is assigned to PA 2, and the TAS was requested by the rules engine. The fact that the TAS was requested by the rules engine indicates that this was a valuation request that the facility automatically routed to PA 2 after the facility applied the rules associated with Business Unit 2 to the assets in the deal. In other words, the rules associated with the business unit attributed a zero value to at least one of the assets in the deal, and the facility accordingly routed an indication of the asset to PA 2 for manual analysis of at least one of the assets. TAS assignments can also be canceled as seen in FIG. 12.

FIG. 13 is a display diagram showing a sample display 1300 presented by the facility in connection with receiving valuations of assets based upon manual analysis. The PA (or other user with the appropriate permissions) can access the display 1300 to create, edit, and/or view information about a TAS. The display 1300 depicts the name of the deal for which the TAS has been requested and a number of assets in the deal, as indicated by reference character 1305. The display 1300 also includes the name of the PA responsible for manually analyzing the assets to value the assets. The display 1300 also includes a columnar interface that depicts for each asset in the deal, information about the particular asset. This information includes the asset number (for example, the number of a U.S. patent), the asset title, the technology area, key valuation, current use, relevance to standards, validity opinion, closest relevant art, number of independent claims, current value, current value explanation, claim technical scope, licensee candidates. The PA can provide information for the TAS to assist in determining a value for assets in the deal.

FIG. 14 is a display diagram showing the display 1200 after a values dashboard tab 1401 has been selected to display a values dashboard 1400. The values dashboard 1400 includes a listing of assets and an indication of the values attributed by rules and the values based upon manual analysis of the assets associated with a particular business unit, as well as other descriptive information about the assets. The values dashboard 1400 can also display other information, such as a current value of the assets based upon a current value listed in a TAS of the assets. The values dashboard 1400 can also display other information, such as working totals of Rules Values and PA Values for the assets, notes regarding the values, and other information. The total of the two working totals is the entity total value for the assets (the in-progress entity total value). A user can request a TAS of the assets in the deal by selecting a "Request TAS" button 1405. Additionally or alternatively, the user can import values, such as existing values for the assets listed in a spreadsheet, by selecting an "Import Val." button 1410. An analysis can be similarly imported. The PA can provide values for the PA values by inserting them into the text boxes in the PA Values column. The PA can also request that other people or entities (for example, other analysts or other organizations) manually analyze the assets, estimate their values, and provide these estimated values to the PA for insertion into the text boxes in the PA Values column, Additionally or alternatively, the user can import a basic pricing schedule that will apply a PA value to the assets based upon, among other things, the current value (for example, Low, Medium, High, Very High, etc.) of the asset listed in the TAS.

FIG. 15 is a display diagram showing the display 1200 showing the values dashboard 1400 with both values attributed to assets by rules and values attributed to assets by PAs based on manual analysis. The entity total rules value is $5,000 (which is the sum of the rules values for the assets in the deal with values attributed by BU 4's rules) and the entity total PA value is $114,500 (which is the sum of the values for assets the PA has manually analyzed to determine their values). FIG. 15 illustrates that the facility overrides rules values with PA to obtain the entity total value for the assets. However, the facility may still use the total rules value to acquire assets. This may occur, for example, in the situation where the seller's asking price can be met by the rules total value, either alone or as increased by amounts from the discretionary account. Accordingly, the facility maintains the total rules value for at least this purpose. When the PA has finished manual analysis of the assets, the PA indicates that the valuation is complete by selecting the checkbox 1505 labeled "Valuation Complete."

FIG. 16 illustrates a region 1605 of the values dashboard 1400 that depicts the name of the rule that attributed a value to the asset, as indicated by reference character 1610. Only the name of the rule that resulted in the highest-value is shown. The region 1605 also illustrates information about the asset, such numbers of independent and dependent claims, as well as other descriptive information associated with the asset or information provided by the PA about the asset. In some embodiments, the names of each rule that attributed a value to the asset are shown, as well as a link to the rule in the display 300.

FIG. 17A is a display diagram illustrating the pricing region 630 after the facility received values for assets based upon manual analysis of the assets. As previously discussed, PA 2 associated with Business Unit 2 has performed manual analysis of the assets. This manual analysis resulted in increasing the entity total value for the assets from $5,000 to $114,500. Accordingly, the entity total value associated with Business Unit 2 accounts for a larger portion of the total value for the assets.

Figure 17B:

FIG. 17B is a display diagram illustrating the display 600 after the PAs responsible for valuing assets have completed their valuation responsibilities. The DTL, can review the values using the tables 905 and 910, If desired, the DTL can request that rules be re-applied to re-value the assets by selecting the "Submit to Rules" button 435. The DTL may wish to do so, for example, if users have modified the set of rules and the DTL wishes to see how the modifications affect the values, if at all. For example, new or modified rules may result in new values attributed to assets, or result in values no longer being attributed to assets. The DTL can also request that manual valuations be re-performed, if desired. If the DTL is satisfied with the results of the valuations, the DTL can initiate notification of the completion of deal valuation by selecting the stage of for-negotiation from the stage drop down menu. The user can then click on a button 1705 labeled "Save and Send Deal Flow Email." Doing so causes the facility to move the deal onto the next stage, which is negotiation, and to send out a notification e-mail to all PAs with this specified deal in their valuation queue. In displays that provide information on multiple deals, the facility can provide an indication of whether valuation is complete for any specific deal, such as a positive indication in a column of a table that provides information on multiple deals.

Returning to the process 700 for acquiring assets of FIG. 7, at step 715 the facility generates a budget for acquiring the assets. For example, the facility may sum the values attributed by rules (that have not been overridden by values based upon manual analysis) with the values based upon the manual analysis of the assets to obtain a total value for the assets. The budget for acquiring the assets is the total value for the assets. The generation of the budget may be performed by, for example, the budget generation unit 215.

At step 720 the facility increases the budget based on values for the assets to one or more other entities. As previously described, an organization operating the facility may use the facility to acquire assets for a fund that the organization manages on behalf of one or more investors. The investors may value the assets according to their levels of interest in the assets. Additionally or alternatively, valuations may be performed on behalf of the investors, either by application of rules associated with the investors to the assets or by manual analysis of the assets. Accordingly, values for the assets attributable to one or more other entities may result in the facility increasing the budget for acquiring the assets to include the values attributable to the other entities. The increasing of the budget may be performed by, for example, the budget generation unit 215.

At step 725 the facility increases the budget based on an amount from a discretionary account that may be used to close acquisitions of assets. For example, a team of one or more people that is leading an effort to acquire assets may have access to an account that contains funds that may be used, at the discretion of the team, to close the effort. The acquisition team may use funds from this account to increase the budget for various reasons, such as to meet an asking price of the seller of the assets. The increasing of the budget may be performed by, for example, the budget generation unit 215.

At step 730 the acquirer acquires the assets. The acquirer may be, for example, a fund in which one or more investors are invested, and at step 730, the fund would acquire ownership of the assets. The acquisition of the assets may be performed by or facilitated at least in part by, for example, the asset acquisition unit 216. At step 735 the facility determines expenses associated with acquiring the assets. The expenses may include the budgeted amount as well as other amounts that are attributable to the acquisition of the assets. The expenses may be determined by, for example, the expense determination unit 217.

At step 740 the facility allocates the expenses associated with acquiring the assets among the multiple entities. For example, the facility may have previously determined that the budget for acquiring the assets was $100,000 based upon a first entity total value of $60,000 provided by a first entity, and a second entity total value of $40,000 provided by a second entity, and the cost to acquire the assets was the budgeted $100,000. Because the first and second values accounted for 60% and 40% of the acquisition cost, respectively, the facility allocates 60% of the expenses to the first entity and 40% of the expenses to the second entity. The facility may implement this by decrementing a first account of the first entity $60,000 and a second account of the second entity $40,000 in order to pay for the assets. Additionally or alternatively, the facility may use other accounting techniques to allocate the expenses among the multiple entities: The allocation of expenses may be performed by, for example, the expense allocation unit 218. The facility may then generate or enable the generation of financial statements for the multiple entities that reflect the allocated expenses. For example, first and second balance sheets may be generated for the first and second entities that show the assets as balance sheet assets, with the $60,000 and $40,000 as respective cost bases. As another example, first and second income statements and/or first and second statement of cash flows may also be generated, using various accounting techniques known to those of skill in the art. The generation of financial statements may be performed, for example, by the financial statement unit 224.

In some embodiments, the facility does not perform certain steps illustrated in FIG. 7. For example, a seller of assets may have an asking price of $50,000 for the assets. The facility may receive values for the assets based upon application of rules to the assets that, when summed, meet or exceed the seller's asking price. Accordingly, the facility may not receive values based upon manual analysis of the assets because such analysis is not required to close the acquisition. The facility may similarly dispense with increasing the budget for acquiring the assets based upon values attributable to the other entities and upon amounts from a discretionary account.

In some embodiments, the facility performs additional steps other than those illustrated in FIG. 7. For example, the facility may determine post-acquisition expenses associated with the assets, using the expense determination unit 217. The facility may then allocate post-acquisition expenses among entities in a manner similar to that described for acquisition expenses. This allocation may be performed, for example, by the expense allocation unit 218.

Modifying Values of Assets

A deal may include several assets that are related to each other. For example, one or more assets in the deal could be continuations, divisionals, or continuations-in-part of another asset in the deal. As another example, an asset in the deal may have descriptive information associated with it that is identical or similar to descriptive information associated with another asset in the deal. Accordingly, a group of two or more assets in the deal may share portions of subject matter. Such assets could each satisfy a certain rule and result in an automatic value being attributed to each of the assets by application of the rule. In such a case, the assets' relationships can be taken into account so as to ensure that the rule does not result in over-valuing the subject matter present in the group of assets, such as by reducing the total value attributed to the group of assets. The facility could do this by identifying a single asset and applying the entire reduced total value to that asset, or by distributing the reduced total value across the group of assets in a pro rata or other fashion. The facility could also take other considerations into account, such as whether or not at least one of the related assets has a continuation application pending, whether or not one or more of the assets are within the deadline for filing a broadening reissue, and/or other considerations.

Figure 18:
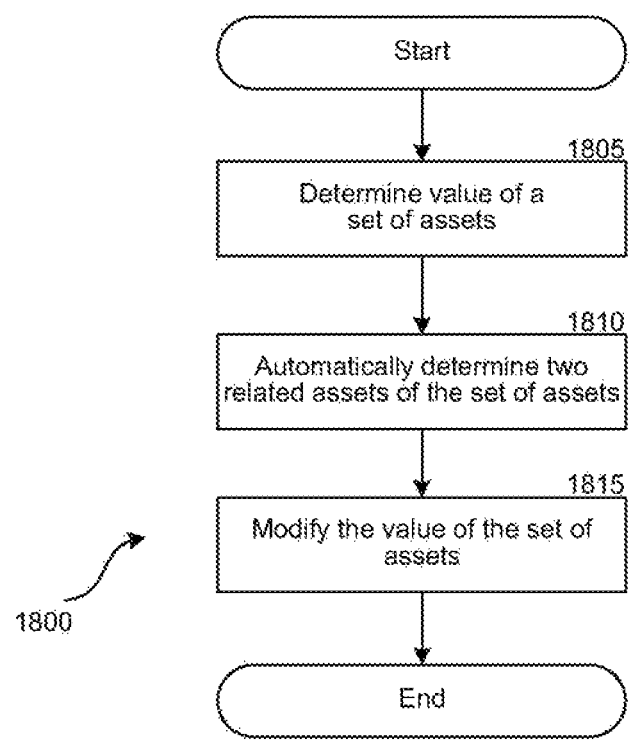
FIG. 18 is a flow diagram of a process implemented by the facility in connection with modifying values of intellectual property assets in some embodiments.

FIG. 18 is a flow diagram of a process 1808 for modifying values, such as for the purpose of accounting for assets that share common subject matter. The process 1800 begins at step 1805, where the facility determines a value of a set of assets. The value of the assets may be determined by, for example, the valuation unit 214. At step 1810, the facility automatically determines two related assets of the set. The facility can determine relatedness in various ways. For example, the facility can review a priority claim in a specification of one asset that indicates that it is related to another asset. As another example, the facility can access metadata associated with the two assets to determine that the two assets are related. As another example, the facility can perform textual comparisons of text in specifications or other portions of the descriptive information associated with the assets to determine that they are related. Those of skill in the art will understand that the facility can use a variety of techniques to determine that the assets are related. The facility may implement the determination of related assets by comparing a first asset of the set with every other asset of the set to determine if the first asset is related to any other assets, then comparing a second asset of the set with every asset of the set other than the first asset to determine if the second asset is related to any other assets, and so forth. The determination of related assets may be performed, for example, by the related asset determination unit 219.

At step 1815, the facility modifies the value of the set. For example, the facility may automatically modify the value of the set of assets. The facility may do so by automatically reducing the value attributed to at least one of the related assets. The modification of the value of the assets may be performed by, for example, the valuation unit 214. As another example, the facility may provide an indication to a PA that the two assets are related and that one or both of their values may necessitate lowering by the PA. The providing of the indication may be performed by, for example, the asset routing unit 212. After step 1815, the process 1800 concludes.

Modifying Rules

An organization operating the facility may own a portfolio of multiple assets, or manage the portfolio on behalf of an owner of the assets. The organization may have multiple objectives directed to the portfolio that it owns or manages, or that are directed to assets that the organization desires to acquire. For example, the organization may wish to acquire a certain number of assets in a certain technology area, such as 50 assets in the area of wireless technology. Entities within the organization may create rules directed to the acquisition of such assets, and the rules may facilitate the acquisition of such assets by the organization.

Continuing with this example, once the organization has obtained 50 wireless assets, the organization may wish to no longer acquire assets in this technology area. Therefore, the organization may wish to disable or delete the rules that are directed to the acquisition of wireless assets. Alternatively or additionally, as the number of wireless assets acquired by the organization approaches 50, the organization could modify the rules to decrease the values to be attributed to wireless assets that satisfy the rules, such as while the wireless assets are being considered for acquisition. For example, a rule may specify that a wireless asset is to be attributed a value of $20,000. This value may be maintained for the first 30 assets, and then reduced to $5,000 for the next 10 assets, and then reduced to $3,000 for the next 5 assets, and so forth.

Figure 19:
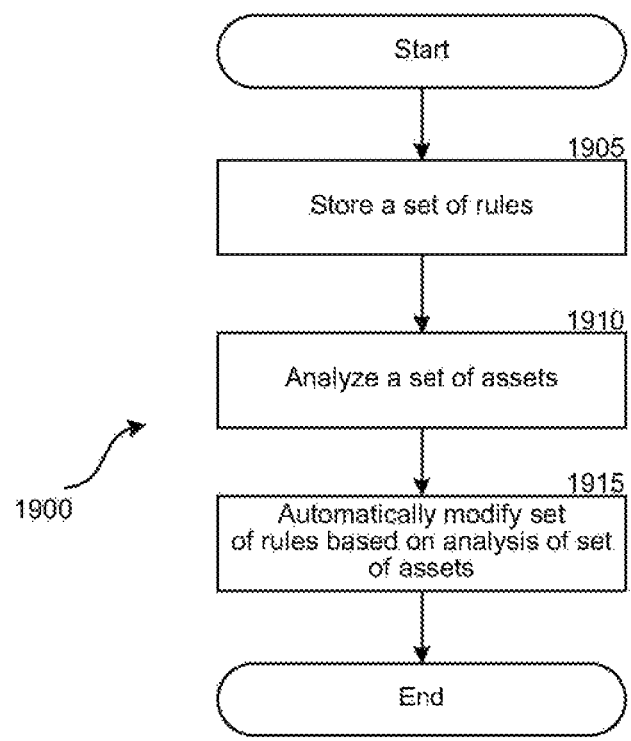
FIG. 19 is a flow diagram of a process implemented by the facility in connection with modifying a set of rules in some embodiments.

FIG. 19 is a flow diagram of a process 1900 for modifying a set of rules, such as for to account for objectives associated with an asset portfolio. The process 1900 begins at step 1905 where the facility stores a set of rules. The rules may be stored by, for example, the General database 135. At step 1910, the facility analyzes a set of assets. For example, the facility may analyze descriptive information associated each of the assets of the set. As part of the analysis, the facility may also determine one or more objectives for the set of assets and determine whether the one or more objectives are satisfied by the assets. The analysis may be performed by, for example, the asset analysis unit 220. At step 1915, the facility automatically modifies the set of rules based on the analysis of the assets. The facility modifies the set of rules by performing at least one of includes at least one of creating a rule, enabling a rule, modifying a rule, and disabling a rule. Modification of the set of rules may be performed by, for example, the rule modification unit 211. After step 1905, the process 1900 concludes.

Operating Environment

Figure 20:
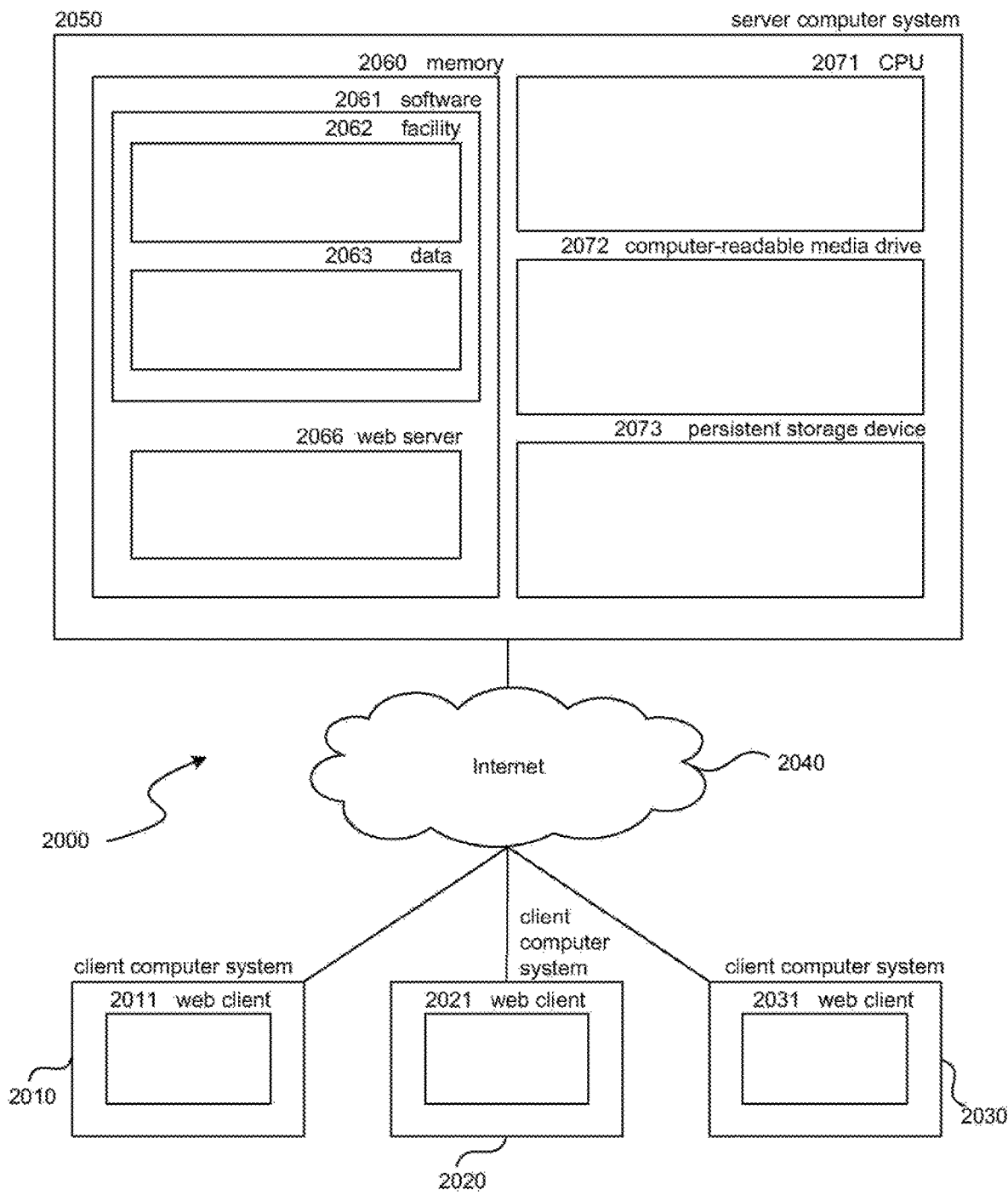
FIG. 20 is a block diagram showing an environment in which the facility operates in some embodiments.

FIG. 20 is a high-level block diagram showing a typical environment 2000 in which the facility operates in some embodiments. The block diagram shows several client computer systems, such as client computer systems 2010, 2020, and 2030. Each of the client computer systems includes a web client computer program for browsing the World Wide Web, such as web clients 2011, 2020, and 2031. The client computer systems are connected via the Internet 2040 or a data transmission network of another type to a server computer system 2050 hosting the facility. Those skilled in the art will recognize that client computer systems could be connected to the server computer system by networks other than the Internet, however.

The server computer system 2050 includes memory 2060. The memory 2060 includes software 2061 incorporating both the facility 2062 and data 2063 typically used by facility. The memory further includes a web server computer program 2066 for delivering web pages in response to requests from web clients. While items 2062 and 2063 are stored in memory while being used, those skilled in the art will appreciate that these items, or portions of them, maybe be transferred between memory and a persistent storage device 2073 for purposes of memory management and data integrity. The server computer system further includes one or more central processing units (CPU) 2071 for executing programs, such as programs 2061, 2062, and 2066, and a computer-readable medium drive 2072 for reading information or installing programs such as the facility from computer-readable storage media, such as a floppy disk, a CD-ROM, a DVD, or a USB flash drive.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

CONCLUSION

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or functional units and/or other technologies described herein can be effected (for example, hardware, software, and/or firmware), and that the preferred implementation vehicle will vary with the context in which the processes and/or systems and/or functional units and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or systems and/or functional units and/or other technologies described herein may be effected, none of which is inherently superior to the other in that any vehicle to be utilized is a choice dependent upon the context in which the vehicle will be deployed and the specific concerns (for example, speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes and/or functional units via the use of block diagrams, flowcharts, and/or examples. Insofar as such block diagrams, flowcharts, and/ or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (for example, as one or more programs running on one or more computer systems), as one or more programs running on one or more processors (for example, as one or more programs running on one or more microprocessors or one or more processor cores), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (for example, a fiber optic cable, a waveguide, a wired communications link, a wireless communication link (for example, transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (for example, a general purpose computer configured by a computer program which at least partially carries out processes and/or devices and/or functional units described herein, or a microprocessor configured by a computer program which at least partially carries out processes and/or devices and/or functional units described herein), electrical circuitry forming a memory device (for example, forms of memory (for example, random access, flash, read only, etc.)), and/or electrical circuitry forming a communications device (for example, a modem, communications switch, optical-electrical equipment, etc.). Those having skill in the art will recognize that the subject matter described herein may be implemented in an analog or digital fashion or some combination thereof.

Those skilled in the art will recognize that it is common within the art to implement devices and/or processes and/or systems and/or functional units, and thereafter use engineering and/or other practices to integrate such implemented devices and/or processes and/or systems and/or functional units into more comprehensive devices and/or processes and/or systems and/or functional units. That is, at least a portion of the devices and/or processes and/or systems and/or functional units described herein can be integrated into other devices and/or processes and/or systems and/or functional units via a reasonable amount of experimentation. Those having skill in the art will recognize that examples of such other devices and/or processes and/or systems and/or functional units might include—as appropriate to context and application—all or part of devices and/or processes and/or systems and/or functional units of (a) an air conveyance (for example, an airplane, rocket, helicopter, etc.), (b) a ground conveyance (for example, a car, truck, locomotive, tank, armored personnel carrier, etc.), (c) a building (for example, a home, warehouse, office, etc.), (d) an appliance (for example, a refrigerator, a washing machine, a dryer, etc.), (e) a communications system (for example, a networked system, a telephone system, a Voice over IP system, etc.), (f) a business entity (for example, an Internet Service Provider (ISP) entity such as Comcast Cable, Qwest, Southwestern Bell, etc.), or (g) a wired/wireless services entity (for example, Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (for example, relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (for example "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

A patent and/or an application for patent has the attributes of personal property.

While the foregoing description makes reference to particular embodiments, the scope of the invention is defined solely by the claims that follow and the elements recited therein.

We claim:

1. A method for implementing a visual user interface structured to enable a user to formulate valuation rules through visual programming using a visual palette of panels and operators that cause a computing system, when the rules are executed, to automatically attribute values to intellectual property assets to produce determining budget information for acquiring intellectual property assets on behalf of a plurality of distinct entities having different values for at least one same asset, the user interface implemented by a-the computing system having a processor, a memory, and a display, the method comprising:

under control of the computing system, presenting in a first area of the display a palette region comprising a plurality of panels available for selection by a user to formulate one or more rules for assigning budget information to a designated set of intellectual property assets, each asset having associated descriptive information;

under control of the computing system, presenting in a second area of the display a workspace region for formulating one or more rules for assigning one or more values to a set of intellectual property assets to be acquired on behalf of the plurality of distinct entities;

under control of the computing system, for each of one or more rules to be formulated by a first entity of the plurality of distinct entities for assigning one or more values to the set of intellectual property assets, responsive to receiving indication of a user selection of one or more selected panels of the plurality of panels from the palette region and one or more operators for joining the one or more selected panels to formulate a current rule, for each selected panel:

instantiating the selected panel to generate a panel instance;

displaying the generated panel instance in the workspace region; and receiving one or more parameters for the generated panel instance and automatically associating the received parameters with the displayed panel instance, the parameters identifying one or more criteria for determining an asset that satisfies the current rule;

assigning a corresponding value to the current rule, the value being non-zero when an asset matching the one or more criteria of the current rule is to be assigned a value automatically by the computing system, the value being zero when the asset matching the one or more criteria of the current rule is to be routed for manual valuation; and automatically generating code logic for implementing the current rule;

under control of the computing system, responsive to receiving indication of a request to execute the one or more rules against a set of designated intellectual property assets, automatically executing the generated code logic for each of the one or more rules, wherein the executed code logic for each of the one or more rules automatically assigns the corresponding value to each asset matching the identified one or more criteria by evaluating descriptive information associated with each asset to determine whether the identified one or more criteria are satisfied, and wherein, when a plurality of the one or more rules assign different corresponding values to a same matching asset, a single corresponding value is automatically determined by the computing system and assigned to the same matching asset, and wherein the automatic assigning of a corresponding value to each asset or a single corresponding value to each asset using the one or more rules automatically values each asset without human performed valuation;

wherein the values automatically assigned to assets of the set of designated intellectual property assets by executing the one or more rules formulated by the first distinct entity are automatically combined by the computing system with values automatically assigned to assets of the set of designated intellectual property assets by a second entity of the plurality of distinct entities using one or more rules formulated by the second distinct entity to generate and display using the visual user interface a budget amount for acquiring the set of designated intellectual property assets, and wherein the budget amount is automatically modifiable by changing a value of at least one rule of the one or more rules associated with the first distinct entity or the second distinct entity; and causing acquisition of one or more assets of the set of designated intellectual property assets based at least in part on the generated budget amount.

2. The method of claim 1, further comprising:
receiving an indication that at least one of the values automatically assigned to assets of the set of designated intellectual property assets has been manually modified and a corresponding overriding value; and
adjusting the generated budget amount based at least in part on the received indication and the corresponding overriding value.

3. The method of claim 2 wherein the adjusting the generated budget amount includes reducing a value of one of the assets of the set of designated intellectual property assets.

4. The method of claim 1, further comprising:
presenting in a third area of the display a results region for displaying the corresponding values assigned to each asset matching the one or more criteria of the one or more rules.

5. The method of claim 1 wherein the single corresponding value is a maximum of each of the corresponding values assigned by the plurality of the one or more rules.

6. The method of claim 1 wherein the automatically combined values to generate the budget amount are a summation, for each asset of the set of designated intellectual property assets, of the values automatically assigned by each distinct entity.

7. The method of claim 1 wherein the method is invoked in response to notification of a deal to acquire assets and designation of a plurality of a set of assets associated with the deal.

8. The method of claim 1, further comprising:
presenting on a fourth area of the display a pricing region for displaying, for each asset in the set of designated intellectual property assets, the corresponding value assigned by executing the one or more rules for each of the plurality of distinct entities; and
determining a portion of the generated budget amount that is allocable to each of the plurality of distinct entities based upon the corresponding values assigned to each asset by each of the plurality of distinct entities.

9. The method of claim 8 wherein the allocable portion for each of the distinct entities is computed as a sum of all of the corresponding values assigned by each distinct entity to each asset in the set of designated intellectual property assets divided by the total budget amount.

10. The method of claim 9 wherein the allocable portion determines ownership of the set of designated intellectual property assets when acquired.

11. The method of claim 9 wherein the allocable portion determines apportionment of post-acquisition expenses between the plurality of distinct entities.

12. The method of claim 1, further comprising:
receiving an indication from one or more investors in an acquirer of the set of designated intellectual property assets of a value of the set of designated intellectual property assets; and
increasing the budget amount based upon the indicated value received from the one or more investors.

13. The method of claim 1, further comprising increasing the budget amount to include an amount from a discretionary account used to close a deal for acquisitions of intellectual property assets.

14. The method of claim 1, further comprising:
responsive to executing the one or more rules against the set of designated intellectual property assets, analyzing the generated budget amount and the corresponding values of one or more assets and determine an acquisition objective; and
based upon the determined acquisition objective, modifying at least one value of at least one rule of the one or more rules associated with the first distinct entity or the second distinct entity to modify the budget amount to be consistent with the determined acquisition objective.

15. A computing system configured to implement a visual user interface structured to enable a user to formulate valuation rules through visual programming using a visual palette of panels and operators that cause the system, when the rules are executed, to automatically attribute values to intellectual property assets to produce budget information for acquiring intellectual property assets on behalf of a plurality of distinct entities having different values for at least one same asset, comprising:
a processor; a memory; a display; and a logic component, including visual user interface logic, display logic, budget generation logic, and rule logic stored in the memory, that is configured when executed on the processor to:
present in a first area of the display a palette region comprising a plurality of panels available for selection by a user to formulate one or more logic rules for assigning budget information to a designated set of intellectual property assets, each asset having associated descriptive information, each rule when formulated having associated one or more criteria and a value;
present in a second area of the display a workspace region for formulating one or more rules for assigning one or more values to a set of intellectual property assets to be acquired on behalf of the plurality of distinct entities;
for each of one or more rules to be formulated by a first entity of the plurality of distinct entities for assigning one or more values to the set of intellectual property assets,
responsive to receiving indication of a user selection of one or more selected panels of the plurality of panels from the palette region and one or more operators for joining the one or more selected panels to formulate a current rule, for each selected panel:
instantiate the selected panel to generate a panel instance;
display the generated panel instance in the workspace region; and
receive one or more parameters for the generated panel instance and automatically associate the received parameters with the displayed panel instance, the parameters identifying one or more criteria for determining an asset that satisfies the current rule;
assign a corresponding value to the current rule, the value being non-zero when an asset matching the one or more criteria of the current rule is to be assigned a value automatically; and
automatically generate code logic for implementing the current rule;

receive an indication of a request to automatically execute the one or more generated rules against a set of designated intellectual property assets;

execute the automatically generated code logic for each of the one or more rules, wherein the executed code logic for each of the one or more rules automatically assigns the corresponding value to each asset matching the identified one or more criteria by evaluating descriptive information associated with each asset to determine whether the identified one or more criteria are satisfied, wherein, when a plurality of the one or more rules assign different corresponding values to a same matching asset, a single corresponding value is automatically determined by the computing system and assigned to the same matching asset, and wherein the automatic assigning of a corresponding value to each asset automatically values each asset without human performed valuation; and wherein the values automatically assigned to assets of the set of designated intellectual property assets by executing the one or more rules formulated by the first distinct entity are automatically combined by the computing system with values automatically assigned to assets of the set of designated intellectual property assets by a second entity of the plurality of distinct entities using one or more rules formulated by the second distinct entity to generate and display using the visual user interface a budget amount for acquiring the set of designated intellectual property assets; and causing acquisition of one or more assets of the set of designated intellectual property assets based at least in part on the generated budget amount.

16. The computing system of claim 15, wherein, when a plurality of the one or more rules assign different corresponding values to a same matching asset, a single corresponding value is determined and assigned to the same matching asset.

17. The computing system of claim 15 wherein the budget amount is automatically modifiable by changing a value of at least one rule of the one or more rules associated with the first distinct entity or the second distinct entity.

18. The computing system of claim 15 wherein the logic component is further configured to determine a portion of the generated budget amount that is allocable to each of the plurality of distinct entities based upon the corresponding values assigned to each asset by each of the plurality of distinct entities.

19. A non-transitory computer-readable storage medium encoding a data structure for use by a visual user interface of a computing system to enable a user to formulate valuation rules through visual programming using a visual palette of panels and operators that cause a computing system, when the rules are executed, to automatically attribute values to intellectual property assets to produce budget information for acquiring intellectual property assets on behalf of a plurality of distinct entities having different values for at least one same asset, the user interface implemented by the computing system having a processor, a memory, and a display, the data structure comprising:

first information identifying a plurality of panels available for selection by a user to formulate one or more rules for assigning budget information to intellectual property assets, each asset having associated descriptive information;

second information for identifying and storing one or more rules that are logical constructs translatable to logical instructions that the computing system can execute to assign values to one or more intellectual property assets, the one or more rules having been formulated by a first distinct entity for assigning one or more values to a set of intellectual property assets to be acquired on behalf of the plurality of distinct entities including the first distinct entity, the identified one or more rules having been formulated by, in response to user selection of one or more selected panels of the plurality of panels from the palette region and one or more operators for joining the one or more selected panels, instantiation of the one or more selected panels and one or more selected operators and receipt of one or more parameters for each rule of the one or more rules that cause association of one or more criteria with each rule; and third information for identifying budget information for one or more assets that satisfy each rule of the formulated one or more rules identified by the second information by automatically executing the logic specified by each rule of the formulated one or more rules identified by the second information to determine whether descriptive information associated with each asset of a designated set of intellectual property assets match the one or more criteria associated with each rule and, upon satisfying a rule, causing automatic assignment and storing by the computing system of the identified budget information to the one or more assets satisfying the rule, wherein, when a plurality of the one or more rules assign different corresponding values to a same matching asset, a single corresponding value is automatically determined by the computing system and assigned to the same matching asset, wherein the automatic assigning of the identified budget information automatically values each asset without human performed valuation, and wherein the automatically assigned budget information is combined with budget information automatically assigned by logic rules formulated by a distinct second entity of the plurality of distinct entities to automatically generate and display via the visual user interface a budget amount for the designated set of intellectual property assets; and causing acquisition of one or more assets of the set of designated intellectual property assets based at least in part on the generated budget amount.

\* \* \* \* \*